US011285608B2

(12) United States Patent
Jea et al.

(10) Patent No.: US 11,285,608 B2
(45) Date of Patent: Mar. 29, 2022

(54) SERVER AND ROBOT SYSTEM INCLUDING THE SAME

(71) Applicant: LG ELECTRONICS INC., Seoul (KR)

(72) Inventors: Youngwoo Jea, Seoul (KR); Taekmin Kwon, Seoul (KR); Hyungmin Kim, Seoul (KR); Pilju Mun, Seoul (KR); Byungkuk Sohn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 16/628,447

(22) PCT Filed: Jan. 3, 2019

(86) PCT No.: PCT/KR2019/000084
§ 371 (c)(1),
(2) Date: Jan. 3, 2020

(87) PCT Pub. No.: WO2020/141638
PCT Pub. Date: Jul. 9, 2020

(65) Prior Publication Data
US 2021/0146547 A1 May 20, 2021

(51) Int. Cl.
*B25J 9/16* (2006.01)
*B25J 9/00* (2006.01)
*B25J 13/06* (2006.01)

(52) U.S. Cl.
CPC .......... *B25J 9/1689* (2013.01); *B25J 9/0084* (2013.01); *B25J 13/06* (2013.01)

(58) Field of Classification Search
CPC ................ B25J 9/16; B25J 9/00; B25J 13/06
See application file for complete search history.

(56) References Cited

U.S. PATENT DOCUMENTS

| 10,482,550 | B1* | 11/2019 | Theobald | ............... | B25J 11/008 |
| 2017/0050321 | A1* | 2/2017 | Look | ............... | G06Q 10/063118 |
| 2017/0100838 | A1* | 4/2017 | Lewis | ............... | B25J 9/1676 |
| 2019/0033868 | A1* | 1/2019 | Ferguson | ............... | G01C 21/3438 |
| 2019/0084161 | A1* | 3/2019 | Tokuhashi | ............... | B25J 9/1694 |
| 2020/0290210 | A1* | 9/2020 | Ha | ............... | B25J 11/008 |

FOREIGN PATENT DOCUMENTS

KR 10-2008-0090150 10/2008

* cited by examiner

*Primary Examiner* — Kira Nguyen
(74) *Attorney, Agent, or Firm* — Ked & Associates, LLP

(57) ABSTRACT

Disclosed is a robot system including a plurality of robots and a server for communicating with the robots and monitoring and controlling the state of the robots, wherein the robots include different kinds of robots, and the server provides an integrated user interface including information about the different kinds of robots to a client.

16 Claims, 20 Drawing Sheets

SERVER AND ROBOT SYSTEM INCLUDING THE SAME

CROSS-REFERENCE TO RELATED PATENT APPLICATIONS

This application is a U.S. National Stage Application under 35 U.S.C. § 371 of PCT Application No. PCT/KR2019/000084, filed Jan. 3, 2019, whose entire disclosure is hereby incorporated by reference.

TECHNICAL FIELD

The present invention relates to a server and a robot system including the same, and more particularly to a server capable of controlling a plurality of robots and providing various kinds of services and a robot system including the same.

BACKGROUND ART

Robots have been developed for industrial purposes and have taken charge of a portion of factory automation. In recent years, the number of fields in which robots are utilized has increased. As a result, a medical robot and an aerospace robot have been developed. In addition, a home robot usable at home is being manufactured. Among such robots, a robot capable of autonomously traveling is called a mobile robot.

With an increase in the use of robots, the demand for robots capable of providing various kinds of information, entertainment, and services in addition to repeated performance of simple functions has increased.

As a result, a communication robot disposed in homes, stores, and public facilities so as to communicate with people is being developed.

In addition, various kinds of services using a mobile robot that is capable of autonomously traveling have been proposed. For example, a prior document (Korean Patent Application Publication No. 10-2008-0090150, Publication Date: Oct. 8, 2008) proposes a service robot capable of providing a service based on the current position while moving in a service area, a service system using the service robot, and a method of controlling the service system using the service robot.

There is a necessity for a scheme capable of monitoring and efficiently controlling the state of a plurality of robots when in use.

DISCLOSURE

Technical Problem

It is an object of the present invention to provide a server capable of effectively administrating and controlling a plurality of robots in order to provide various kinds of services and a robot system including the same.

It is another object of the present invention to provide a low-cost, high-efficiency server capable of minimizing intervention of an administrator and a robot system including the same.

It is another object of the present invention to provide a server capable of efficiently providing the optimum service using different kinds of robots and a robot system including the same.

It is another object of the present invention to provide a server capable of selecting a combination suitable for the place at which a service is provided and the kind of the service in order to provide the service using a minimum number of robots and a robot system including the same.

It is another object of the present invention to provide a server capable of effectively utilizing data acquired through a plurality of robots and a robot system including the same.

It is a further object of the present invention to provide a server connected to an external server in order to provide various kinds of services and a robot system including the same.

Technical Solution

In accordance with an aspect of the present invention, the above and other objects can be accomplished by the provision of a server and a robot system including the same that are capable of effectively administrating a plurality of robots in order to provide various kinds of services. In particular, different kinds of robots may be effectively administrated and controlled in order to provide the optimum service satisfying the request of a customer.

In accordance with another aspect of the present invention, the above and other objects can be accomplished by the provision of a robot system including a plurality of robots and a server for communicating with the robots and monitoring and controlling the state of the robots, wherein the robots include different kinds of robots, and the server provides an integrated user interface including information about the different kinds of robots to a client.

In accordance with another aspect of the present invention, the above and other objects can be accomplished by the provision of a server including a control server for communicating with a plurality of robots and monitoring and controlling the state of the robots, wherein the robots include different kinds of robots, and the server provides an integrated user interface comprising information about the different kinds of robots to a client.

Upon receiving data from a linked external server, the server may update data of robots related to the received data, among the plurality of robots, in a bundle.

In addition, the server may automatically receive data from the linked external server in a predetermined cycle, and may update data of the robots related to the received data in a bundle.

In addition, the server may apply data uploaded in a common unit to all of the robots, and may apply data uploaded in a dedicated unit to robots corresponding to the dedicated unit in which the data are uploaded. In this case, the dedicated unit may include a plurality of dedicated units so as to correspond to the kind of robots.

Meanwhile, the control server may provide a control service capable of monitoring the state and location of the robots and administrating content and task schedules. The control server may include a control service server for providing the control service capable of monitoring the state and location of the robots and administrating the content and task schedules and an administrator application server capable of administrating an application related to the robots.

In addition, the server may further include a device administration server for relaying and administrating data related to the robots and a map server for providing map data.

Meanwhile, the integrated user interface may include entire robot status information and robot-kind-based state information classified depending on the kind of robots. In this case, the robot-kind-based state information may include a robot kind title item, a current state title item, and robot number information corresponding to the current state title item, and the current state title item and the robot number information may be displayed in different colors depending on the state thereof.

In addition, the integrated user interface may further include location status information, in which the current locations of robots are displayed on a map, and individual robot state information.

Meanwhile, the server may provide entire statistical data based on data gathered from all robots, kind-based statistical data based on data gathered from the same kind of robots, and individual statistical data based on data received from individual robots.

In addition, the server may provide function- or service-based statistical data based on data gathered from robots capable of performing predetermined functions or services.

Advantageous Effects

According to at least one of the embodiments of the present invention, it is possible to provide various kinds of services using a plurality of robots, thereby improving use convenience.

In addition, according to at least one of the embodiments of the present invention, it is possible to realize a low-cost, high-efficiency cooperation system between robots capable of minimizing intervention of an administrator.

In addition, according to at least one of the embodiments of the present invention, it is possible to efficiently provide the optimum service using different kinds of robots.

In addition, according to at least one of the embodiments of the present invention, it is possible to select a combination suitable for the place at which a service is provided and the kind of the service in order to provide the service using a minimum number of robots.

In addition, according to at least one of the embodiments of the present invention, it is possible to effectively administrate a plurality of robots and to utilize data acquired through the robots.

In addition, according to at least one of the embodiments of the present invention, it is possible to realize a robot system connected to an external server in order to provide various kinds of services.

Various other effects of the present invention will be directly or suggestively disclosed in the following detailed description of the invention.

BEST MODE

Reference will now be made in detail to embodiments, examples of which are illustrated in the accompanying drawings. However, the present invention may be embodied in many different forms and should not be construed as being limited to the embodiments set forth herein.

Meanwhile, in the following description, with respect to constituent elements used in the following description, the suffixes "module" and "unit" are used or combined with each other only in consideration of ease in the preparation of the specification, and do not have or indicate mutually different meanings. Accordingly, the suffixes "module" and "unit" may be used interchangeably.

It will be understood that although the terms "first," "second," etc., may be used herein to describe various components, these components should not be limited by these terms. These terms are only used to distinguish one component from another component.

Figure 1:
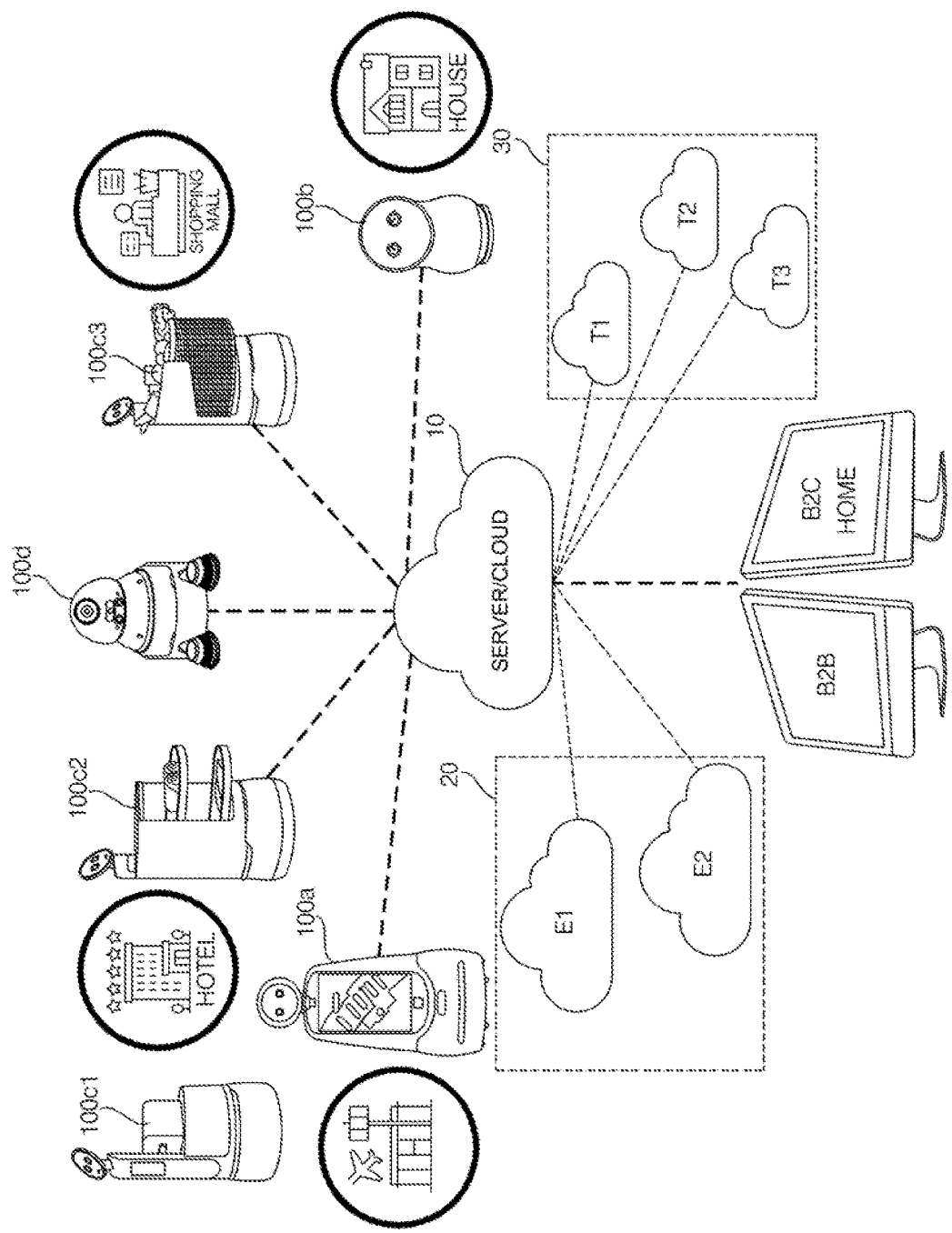
FIG. 1 is a view showing the construction of a robot system according to an embodiment of the present invention.

FIG. 1 is a view showing the construction of a robot system according to an embodiment of the present invention.

Referring to FIG. 1, the robot system 1 according to an embodiment of the present invention may include one or more robots 100a, 100b, 100c1, 100c2, and 100c3 in order to provide services at various places, such as an airport, a hotel, a mart, a clothing store, a logistics center, and a hospital. For example, the robot system 1 may include at least one of a guide robot 100a for providing information about a specific place, article, and service, a home robot 100b for interacting with a user at home and communicating with another robot or electronic device based on user input, delivery robots 100c1, 100c2, and 100c3 for delivering specific articles, or a cleaning robot 100d for performing cleaning while autonomously traveling.

Preferably, the robot system 1 according to an embodiment of the present invention includes a plurality of robots 100a, 100b, 100c1, 100c2, 100c3, and 100d and a server 10 for administrating and controlling the robots 100a, 100b, 100c1, 100c2, 100c3, and 100d.

The server 10 may remotely monitor and control the state of the robots 100a, 100b, 100c1, 100c2, 100c3, and 100d, and the robot system 1 may provide more effective services using the robots 100a, 100b, 100c1, 100c2, 100c3, and 100d.

More preferably, the robot system 1 includes various kinds of robots 100a, 100b, 100c1, 100c2, 100c3, and 100d. Consequently, it is possible to provide various kinds of services through the respective robots and to provide more various and convenient services through cooperation between the robots.

The robots 100a, 100b, 100c1, 100c2, 100c3, and 100d and the server 10 may include a communication means (or communication interfaces) (not shown) that supports one or more communication protocols in order to communicate with each other. In addition, the robots 100a, 100b, 100c1, 100c2, 100c3, and 100d and the server 10 may communicate with a PC, a mobile terminal, or another external server.

For example, the robots 100a, 100b, 100c1, 100c2, 100c3, and 100d and the server 10 may communicate with each other using a message queuing telemetry transport (MQTT) scheme.

Alternatively, the robots 100a, 100b, 100c1, 100c2, 100c3, and 100d and the server 10 may communicate with each other using a hypertext transfer protocol (HTTP) scheme.

In addition, the robots 100a, 100b, 100c1, 100c2, 100c3, and 100d and the server 10 may communicate with a PC, a mobile terminal, or another external server using the HTTP or MQTT scheme.

Depending on circumstances, the robots 100a, 100b, 100c1, 100c2, 100c3, and 100d and the server 10 may support two or more communication protocols, and may use the optimum communication protocol depending on the kind of communication data or the kind of a device participating in communication.

The server 10 may be realized as a cloud server, whereby a user may use data stored in the server 10 and a function or service provided by the server 10 using any of various devices, such as a PC or a mobile terminal, which is connected to the server. The cloud server 10 may be operatively connected to the robots 100a, 100b, 100c1, 100c2, 100c3, and 100d in order to monitor and control the robots 100a, 100b, 100c1, 100c2, 100c3, and 100d and to remotely provide various solutions and content.

The user may retrieve or control information about the robots 100a, 100b, 100c1, 100c2, 100c3, and 100d in the robot system using the PC or the mobile terminal.

In this specification, the "user" is a person who uses a service through at least one robot, and may include an individual customer who purchases or borrows a robot in order to use the robot at home, a manager or a staff member of a company who provides services to the staff or customers using a robot, and customers who use services provided by the company. Consequently, the "user" may include an individual customer (business to consumer; B2C) and a business customer (business to business; B2B).

The user may monitor the state and location of the robots 100a, 100b, 100c1, 100c2, 100c3, and 100d in the robot system and may administrate content and task schedules using the PC or the mobile terminal.

Meanwhile, the server 10 may store and administrate information received from the robots 100a, 100b, 100c1, 100c2, 100c3, and 100d and other devices.

The server 10 may be a server that is provided by a manufacturing company of the robots 100a, 100b, 100c1, 100c2, 100c3, and 100d in the robot system and may administrate content and task schedules or a company to which the manufacturing company entrusts services.

Meanwhile, the system according to the present invention may be operatively connected to two or more servers.

For example, the server 10 may communicate with external cloud servers 20, such as E1 and E2, and with third parties 30 providing content and services, such as T1, T2, and T3. Consequently, the server 10 may be operatively connected to the external cloud servers 20 and with third parties 30 in order to provide various kinds of services.

The server 10 may be a control server for administrating and controlling the robots 100a, 100b, 100c1, 100c2, 100c3, and 100d.

The server 10 may simultaneously or individually control the robots 100a, 100b, 100c1, 100c2, 100c3, and 100d. In addition, the server 10 may group at least some of the robots 100a, 100b, 100c1, 100c2, 100c3, and 100d in order to perform group-based control.

Meanwhile, the server 10 may be configured as a plurality of servers, to which information and functions are distributed, or as a single integrated server.

Since the server 10 is configured as a plurality of servers, to which information and functions are distributed, or as a single integrated server in order to administrate all services using the robots, the server may be called a robot service delivery platform (RSDP).

FIGS. 2a to 2d are reference views illustrating a robot service delivery platform included in the robot system according to the embodiment of the present invention.

Figure 2A:
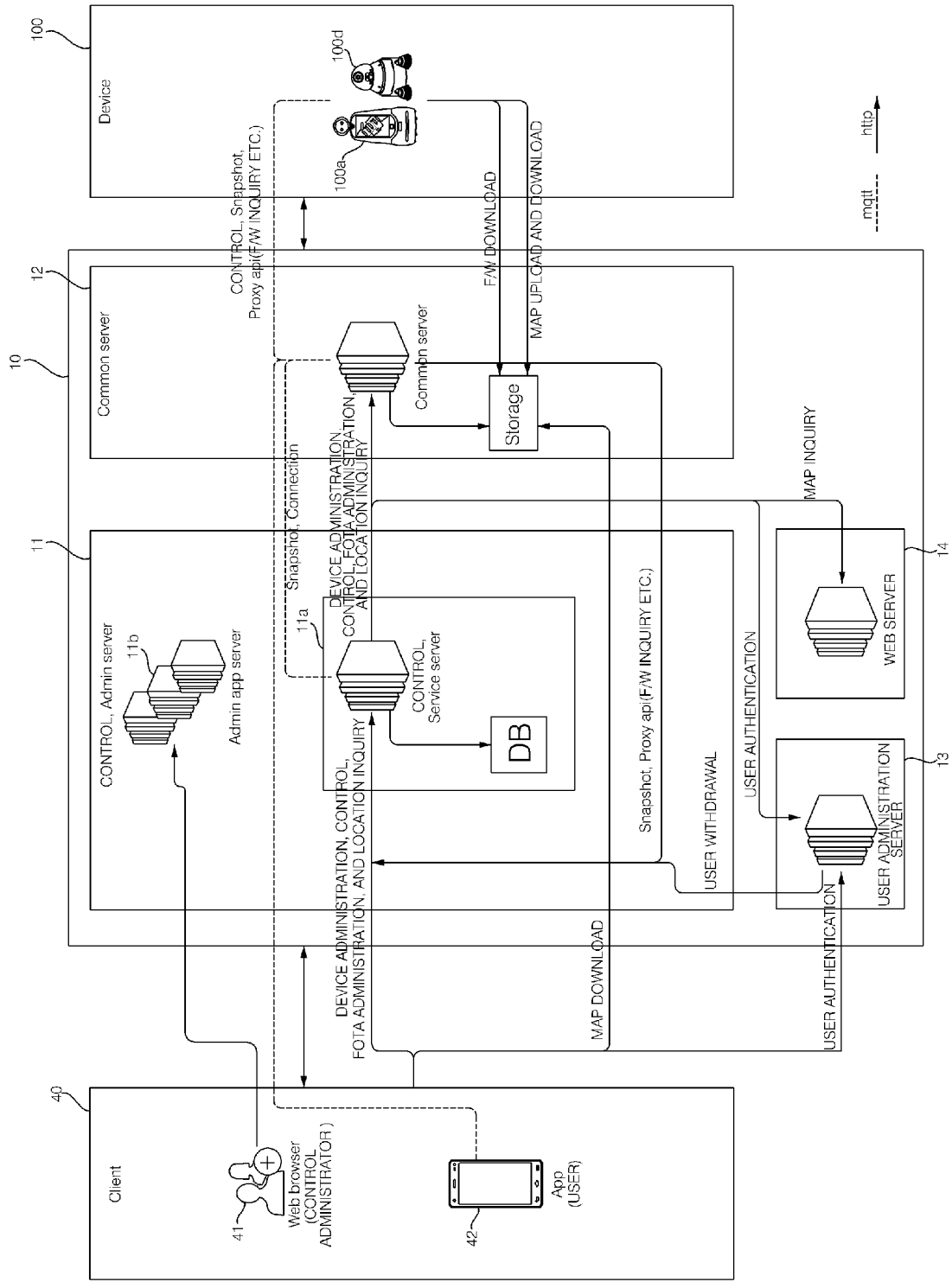
FIGS. 2a to 2d are reference views illustrating a robot service delivery platform included in the robot system according to the embodiment of the present invention.

FIG. 2a exemplarily shows a communication architecture of a robot service delivery platform according to an embodiment of the present invention.

Referring to FIG. 2a, the robot service delivery platform 10 may include one or more servers 11 and 12 in order to administrate and control robots 100, such as the guide robot 100a or the cleaning robot 100d.

The robot service delivery platform 10 may include a control server 11 for communicating with a client 40 through a web browser 41 or an application 42 in a mobile terminal and administrating and controlling the robots 100 and a device administration server 12 for relaying and administrating data related to the robot 100.

The control server 11 may include a control/service server 11a for providing a control service capable of monitoring the state and location of the robots 100 and administrating content and task schedules based on user input received from the client 40 and an administrator application server 11b that a control administrator is capable of accessing through the web browser 41.

The control/service server 11a may include a database, and may respond to a service request from the client 40, such as robot administration, control, firmware over the air (FOTA) upgrade, and location inquiry.

The control administrator may access the administrator application server 11b under the authority of the administrator, and the administrator application server may administrate functions related to the robot, applications, and content.

The device administration server 12 may function as a proxy server, and store metadata related to original data, and may perform a data backup function utilizing a snapshot indicating the state of a storage device.

The device administration server 12 may include a storage for storing various kinds of data and a common server for communicating with the control/service server 11a. The common server may store various kinds of data in the storage, may retrieve data from the storage, and may respond to a service request from the control/service server 11a, such as robot administration, control, firmware over the air, and location inquiry.

In addition, the robots 100 may download map data and firmware data stored in the storage.

Since the control server 11 and the device administration server 12 are separately configured, it is not necessary to retransmit data after storing the data in the storage, where there is an advantage in terms of the processing speed and time and effective administration is easily achieved in terms of security.

Meanwhile, the robot service delivery platform 10 is a set of servers that provide services related to the robot, and may mean all components excluding the client 40 and the robots 100 in FIG. 2a.

For example, the robot service delivery platform 10 may further include a user administration server 13 for administrating user accounts. The user administration server 13 may administrate user authentication, registration, and withdrawal.

In some embodiments, the robot service delivery platform 10 may further include a map server 14 for providing map data and data based on geographical information.

The map data received by the map server 14 may be stored in the control server 11 and/or the device administration server 12, and the map data in the map server 14 may be downloaded by the robots 100. Alternatively, the map data may be transmitted from the map server 14 to the robots 100 according to a request from the control server 11 and/or the device administration server 12.

The robots 100 and the servers 11 and 12 may include a communication means (not shown) that support one or more communication protocols in order to communicate with each other.

Referring to FIG. 2a, the robots 100 and the servers 11 and 12 may communicate with each other using the MQTT scheme. The MQTT scheme is a scheme in which a message is transmitted and received through a broker, and is advantageous in terms of low power and speed. Meanwhile, in the case in which the robot service delivery platform 10 uses the MQTT scheme, the broker may be constructed in the device administration server 12.

In addition, the robots 100 and the servers 11 and 12 may support two or more communication protocols, and may use the optimum communication protocol depending on the kind of communication data or the kind of a device participating in communication. FIG. 2a exemplarily shows a communication path using the MQTT scheme and a communication path using the HTML scheme.

Meanwhile, the servers 11 and 12 and the robots 100 may communicate with each other using the MQTT scheme irrespective of the kind of the robots.

The robots 100 may transmit the current state thereof to the servers 11 and 12 through an MQTT session, and may receive remote control commands from the servers 11 and 12. For MQTT connection, a digital certificate of authentication, such as a personal key (issued for SCR generation), an X.509 certificate of authentication received at the time of robot registration, or a certificate of device administration server authentication, or may other authentication schemes may be used.

In FIG. 2a, the servers 11, 12, 13, and 14 are classified based on the functions thereof. However, the present invention is not limited thereto. Two or more functions may be performed by a single server, and a single function may be performed by two or more servers.

Figure 2B:
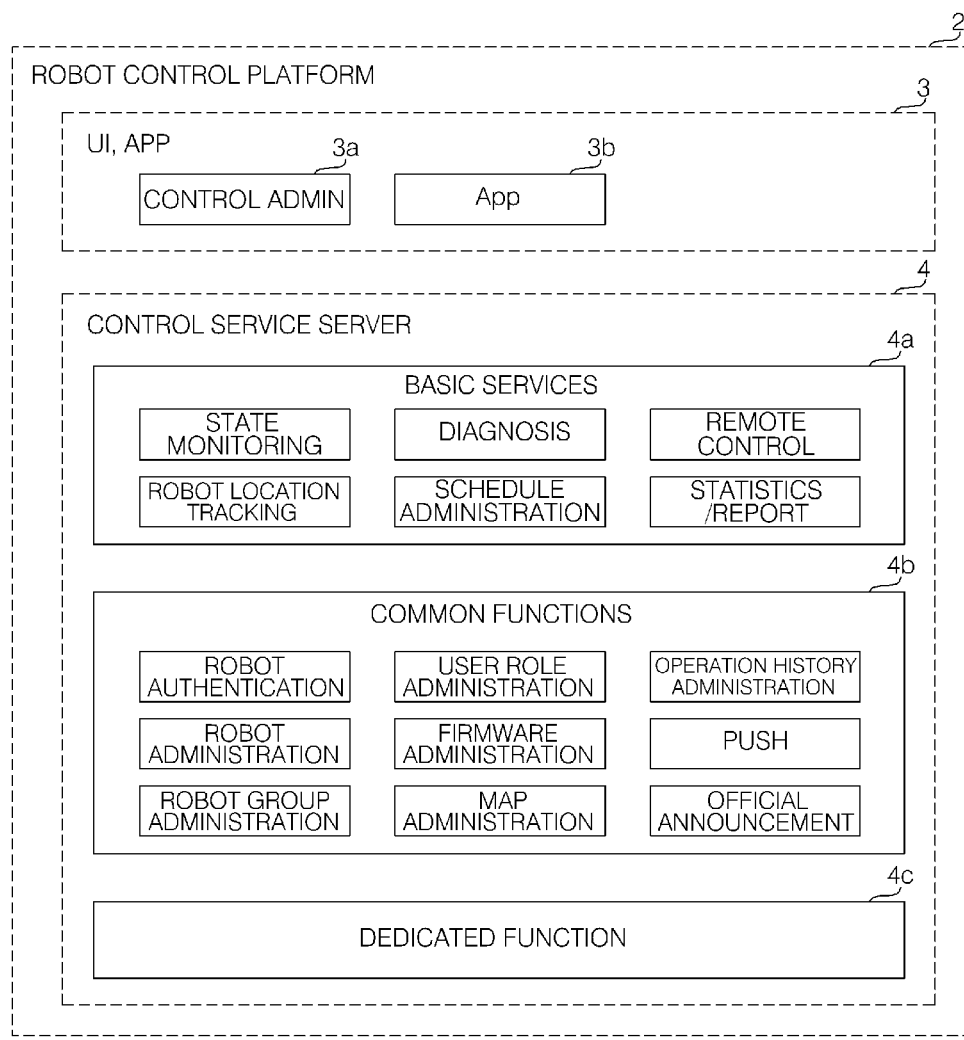

FIG. 2b exemplarily shows a block diagram of the robot service delivery platform according to the embodiment of the present invention, and exemplarily shows upper-level applications of a robot control platform related to robot control.

Referring to FIG. 2b, the robot control platform 2 may include a user interface 3 and functions/services 4 provided by the control/service server 11a.

The robot control platform 2 may provide a web site-based control administrator user interface 3a and an application-based user interface 3b.

The client 40 may use the user interface 3b, provided by the robot control platform 2, through their own device.

Figure 2C:
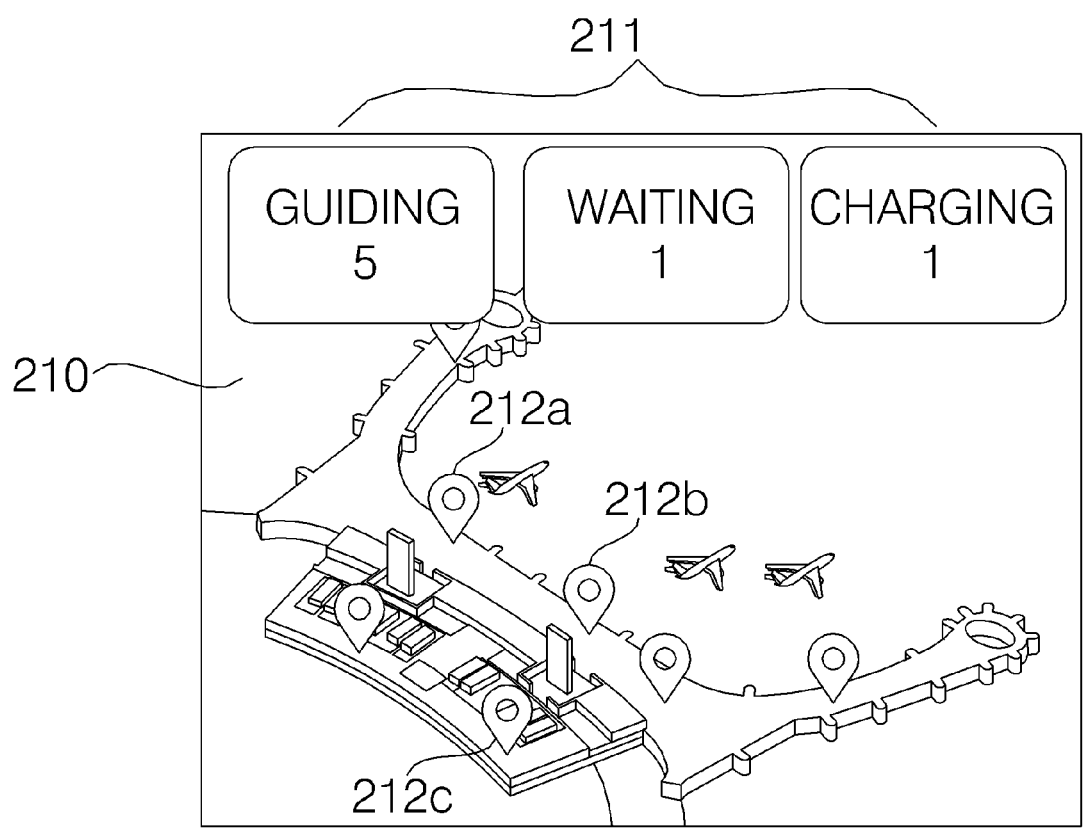
Figure 2D:
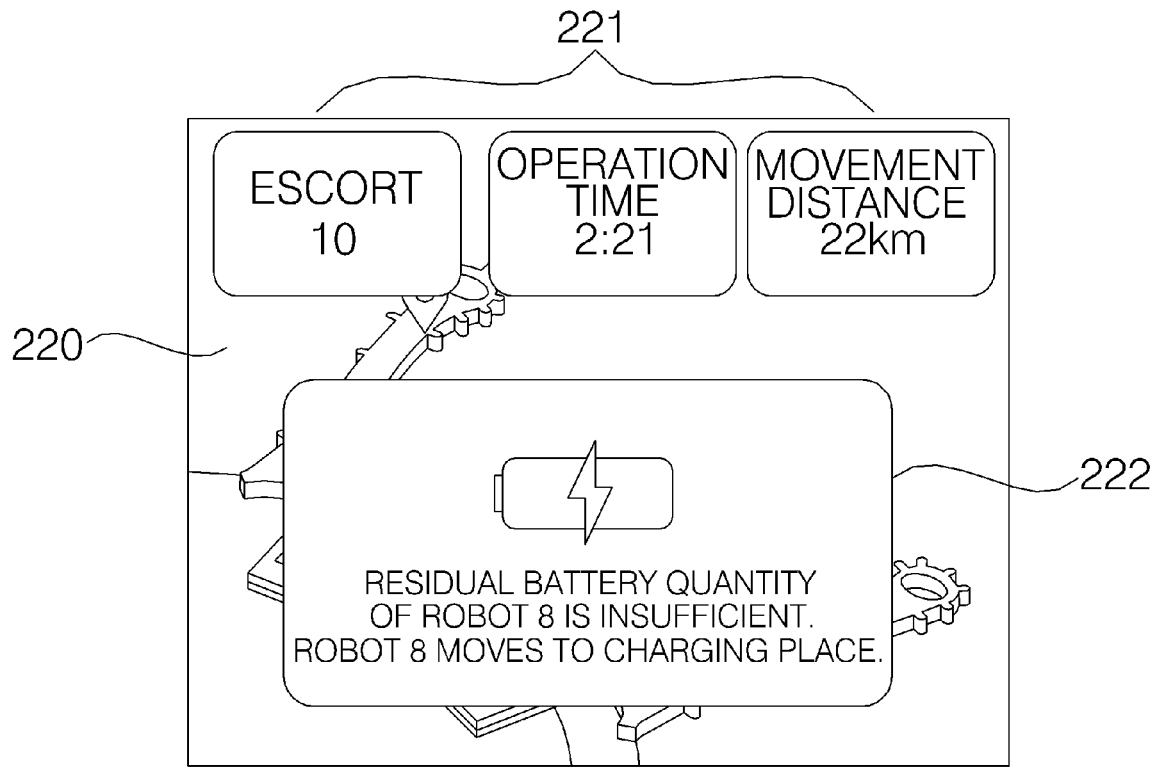

FIGS. 2c and 2d exemplarily show a user interface provided by the robot service delivery platform 10 according to the embodiment of the present invention.

FIG. 2c shows a monitoring screen 210 related to a plurality of guide robots 100a.

Referring to FIG. 2c, the user interface screen 210 provided by the robot service delivery platform 10 may include state information 211 of the robots and location information 212a, 212b, and 212c of the robots.

The state information 211 may indicate the current state of the robots, such as guiding, waiting, or charging.

The location information 212a, 212b, and 212c may indicate the current location of the robots on a map screen. In some embodiments, the location information 212a, 212b, and 212c may be displayed using different shapes and colors depending on the state of the robots in order to intuitively provide much more information.

The user may monitor the operation mode of the robots and the current location of the robots in real time through the user interface screen 210.

FIG. 2d shows monitoring screens relates to an individual guide robot 100a.

Referring to FIG. 2d, when the individual guide robot 100a is selected, a user interface screen 220 including history information 221 for a predetermined period of time may be provided.

The user interface screen 220 may include information about the current location of the selected individual guide robot 100a.

In addition, the user interface screen 220 may include notification information 222 about the individual guide robot 100a, such as the residual battery quantity and movement thereof.

Meanwhile, referring to FIG. 2b, the control/service server 11a may include common units 4a and 4b including functions and services that are commonly applied to the robots and a dedicated unit 4c including specialized functions related to at least some of the robots.

In some embodiments, the common units 4a and 4b may be divided into basic services 4a and common functions 4b.

The common units 4a and 4b may include a state monitoring service capable of checking the state of the robots, a diagnostic service capable of diagnosing the state of the robots, a remote control service capable of remotely controlling the robots, a robot location tracking service capable of tracking the location of the robots, a schedule administration service capable of assigning, checking, and modifying tasks of the robots, and a statistics/report service capable of checking various kinds of statistical data and analysis reports.

In addition, the common units 4a and 4b may include a user roll administration function of administrating the authority of a robot authentication function user, an operation history administration function, a robot administration function, a firmware administration function, a push function related to a push notification, a robot group administration function capable of setting and administrating groups of robots, a map administration function capable of checking and administrating map data and version information, and an official announcement administration function.

The dedicated unit 4c may include specialized functions considering the places at which the robots are operated, the kind of services, and the requests of customers. The dedicated unit 4c may mainly include specialized functions for B2B customers. For example, in the case of the cleaning robot 100d, the dedicated unit 4c may include a cleaning area setting function, a site-based state monitoring function, a cleaning schedule setting function, and a cleaning history inquiry function.

Meanwhile, the specialized functions provided by the dedicated unit 4c may be based on functions and services that are commonly applied. For example, the specialized functions may be configured by modifying the basic services 4a or adding predetermined services to the basic services 4a.

Alternatively, the specialized functions may be configured by modifying some of the common functions 4b.

In this case, the basic services or the common functions corresponding to the specialized functions provided by the dedicated unit 4c may be removed or inactivated.

Figure 3:
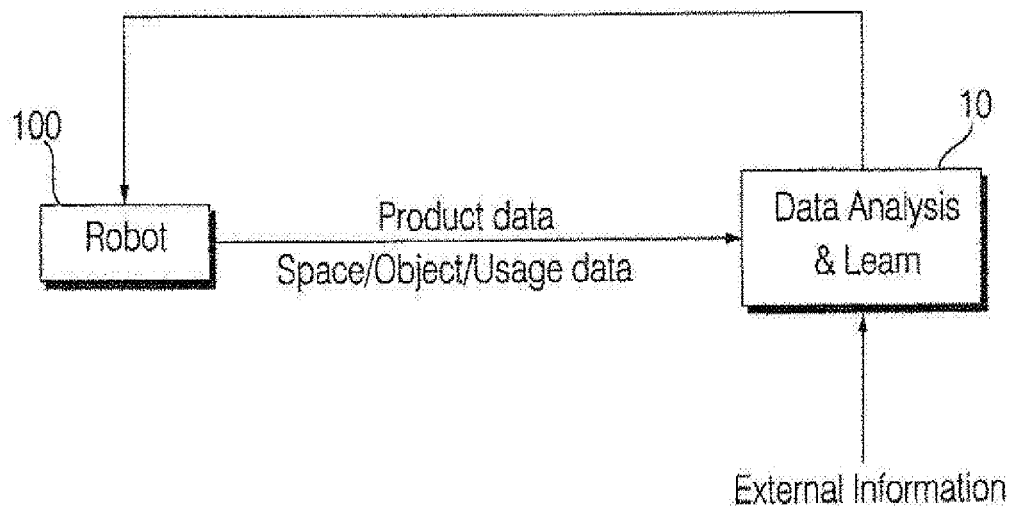
FIG. 3 is a reference view illustrating learning using data acquired by a robot according to an embodiment of the present invention.

FIG. 3 is a reference view illustrating learning using data acquired by a robot according to an embodiment of the present invention.

Referring to FIG. 3, product data acquired by the operation of a predetermined device, such as a robot 100, may be transmitted to the server 10.

For example, the robot 100 may transmit space-, object-, and usage-related data to the server 10.

Figure 7:
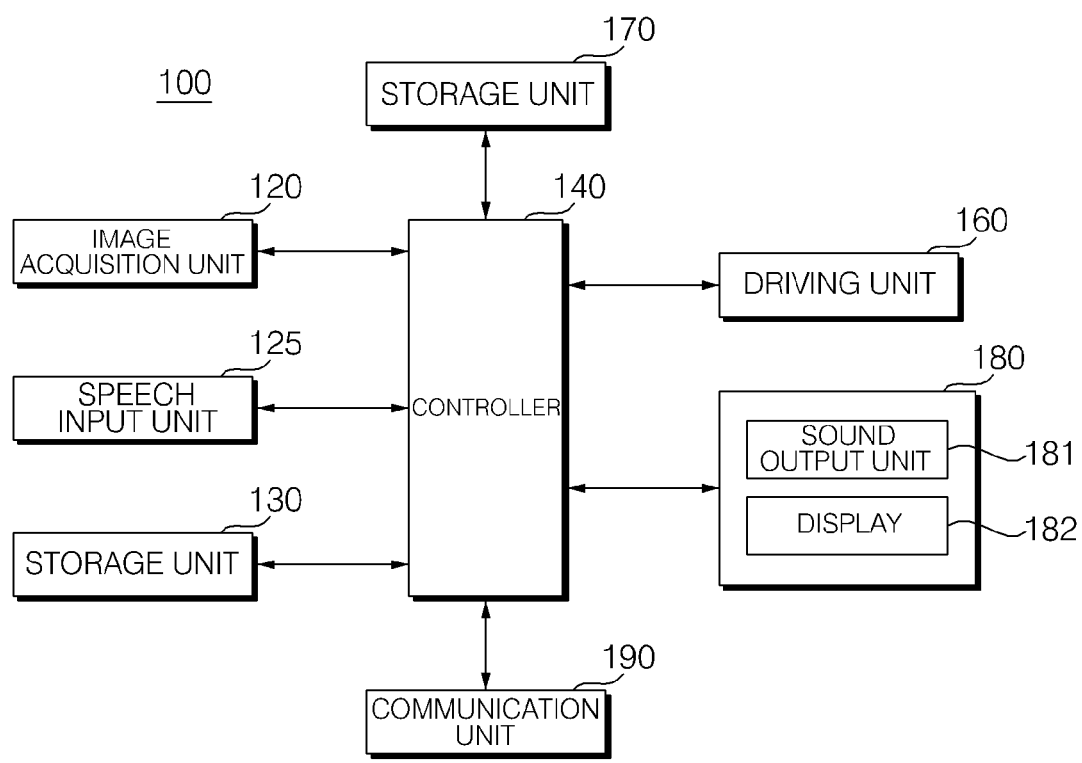
FIG. 7 shows an example of a simple internal block diagram of a robot according to an embodiment of the present invention.

Here, the space- and object-related data may be recognition-related data of the space and object recognized by the robot 100 or image data about the space and object acquired by an image acquisition unit 120 (see FIG. 7).

In some embodiments, the robot 100 and the server 10 may include a software- or hardware-type artificial neural network (ANN) trained to recognize at least one of the attributes of users, the attributes of speeches, the attributes of spaces, or the attributes of objects, such as obstacles.

In an embodiment of the present invention, the robot 100 and the server 10 may include a deep neural network (DNN) trained using deep learning, such as a convolutional neural network (CNN), a recurrent neural network (RNN), or a deep belief network (DBN). For example, the deep neural network (DNN), such as the convolutional neural network (CNN), may be provided in a controller 140 (see FIG. 7) of the robot 100.

The server 10 may train the deep neural network (DNN) based on the data received from the robot 100 and data input by a user, and may transmit the updated data of the deep neural network (DNN) to the robot 100. Consequently, the deep neural network (DNN) included in the robot 100 may be updated.

In addition, the usage-related data, which are data acquired as the result of using a predetermined product, for example, the robot 100, may include usage history data and sensing data acquired by a sensor unit 170 (see FIG. 7).

The trained deep neural network (DNN) may receive input data for recognition, may recognize the attributes of a person, an object, and a space included in the input data, and may output the result.

In addition, the trained deep neural network (DNN) may receive input data for recognition, and may analyze and train usage-related data of the robot 100 in order to recognize the usage pattern and the usage environment.

Meanwhile, the space-, object-, and usage-related data may be transmitted to the server 10 through a communication unit 190 (see FIG. 7).

The server 10 may train the deep neural network (DNN) based on the received data, and may transmit the updated data of the deep neural network (DNN) to the robot 100 such that the robot is updated.

Consequently, a user experience UX in which the robot 100 becomes smarter and evolves as the result of repetitive use may be provided.

The robot 100 and the server 10 may use external information. For example, the server 10 may synthetically use external information acquired from other service servers 20 and 30 connected thereto in order to provide an excellent user experience.

The server 10 may receive a speech input signal from a user in order to perform speech recognition. To this end, the server 10 may include a speech recognition module, and the speech recognition module may include an artificial neural network trained to perform speech recognition with respect to input data and to output the result of speech recognition.

In some embodiments, the server 10 may include a speech recognition server for speech recognition. In addition, the speech recognition server may include a plurality of servers for performing assigned tasks of the speech recognition. For example, the speech recognition server may include automatic speech recognition (ASR) server for receiving speech data and converting the received speech data into text data and a natural language processing (NLP) server for receiving the text data from the automatic speech recognition server and analyzing the received text data in order to determine a speed command. Depending on circumstances, the speech recognition server may further include a text-to-speech (TTS) server for converting the text speech recognition result output by the natural language processing server into speech data and transmitting the speech data to another server or to another device.

According to the present invention, user speech may be used as an input for controlling the robot 100, since the robot 100 and/or the server 10 are capable of performing speech recognition.

In addition, according to the present invention, the robot 100 may actively provide information or output speech for recommending a function or a service first, whereby it is possible to provide more various and positive control functions to the user.

FIGS. 4, 5, and 6a to 6d are views exemplarily showing robots according to embodiments of the present invention. The robots 100 may be disposed or may travel in specific spaces in order to perform given tasks.

Figure 4:
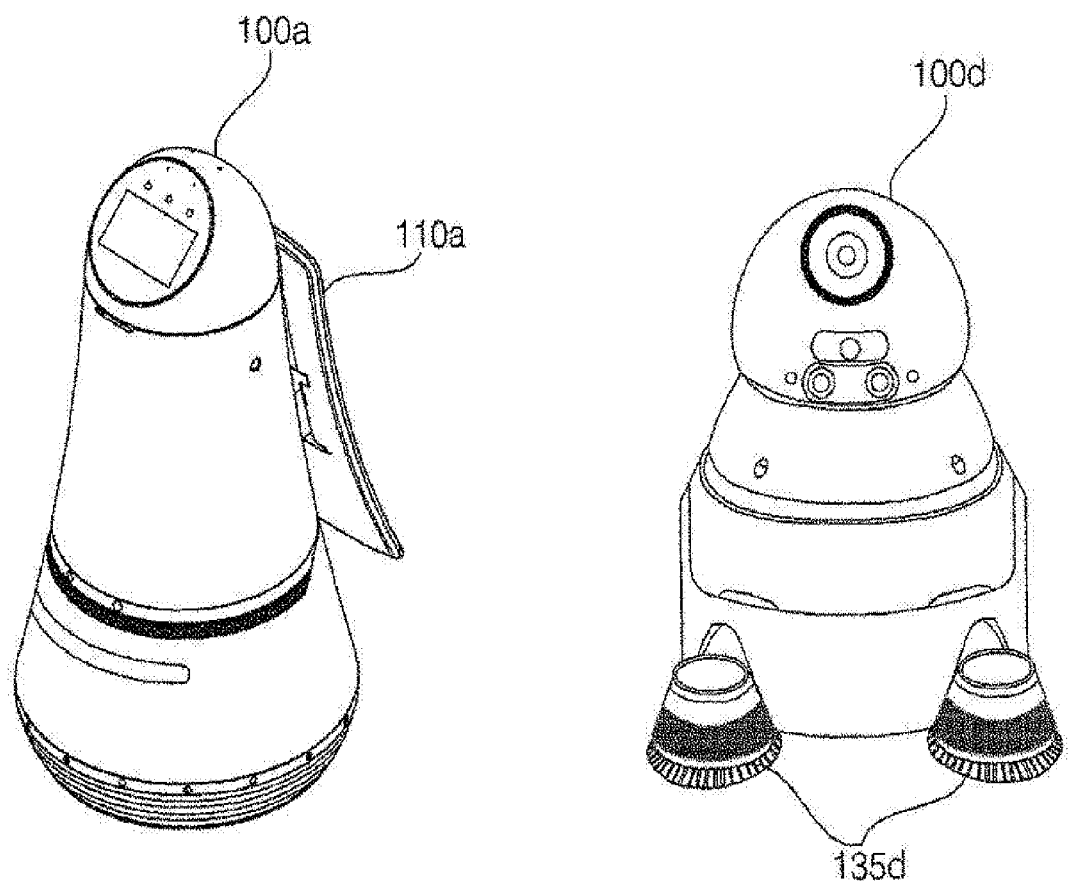
FIGS. 4, 5, and 6a to 6d are views exemplarily showing robots according to embodiments of the present invention.

FIG. 4 exemplarily shows mobile robots mainly used in public places. A mobile robot is a robot that autonomously moves using wheels. Consequently, the mobile robot may be a guide robot, a cleaning robot, an entertain robot, a home-help robot, or a guard robot. However, the present invention is not limited at to the kind of the mobile robot.

FIG. 4 shows a guide robot 100a and a cleaning robot 100d.

The guide robot 100a may include a display 110a in order to display a predetermined image, such as a user interface screen.

In addition, the guide robot 100a may display a user interface (UI) screen including events, advertisements, and guide information on the display 110a. The display 110a may be configured as a touchscreen so as to be used as an input means.

In addition, the guide robot 100a may receive user input, such as touch input or speech input, and may display information about an object or a place corresponding to the user input on the display 110a.

In some embodiments, the guide robot 100a may be provided with a scanner capable of recognizing a ticket, an airline ticket, a barcode, a QR code, etc. for guide.

In addition, the guide robot 100a may provide an escort service of guiding a user to a specific destination while moving to the specific destination in response to a user request.

The cleaning robot 100d may include a cleaning tool 135d, such as a brush, in order to clean a specific space while autonomously moving.

The mobile robots 100a and 100d may perform given tasks while traveling in specific spaces. The mobile robots 100a and 100d may perform autonomous traveling, in which the robots move while generating paths to specific destinations, or following traveling, in which the robots follow people or other robots. In order to prevent the occurrence of a safety-related accident, the mobile robots 100*a* and 100*d* may travel while avoiding obstacles sensed based on image data acquired by the image acquisition unit 120 or sensing data acquired by the sensor unit 170 during the movement thereof.

Figure 5:
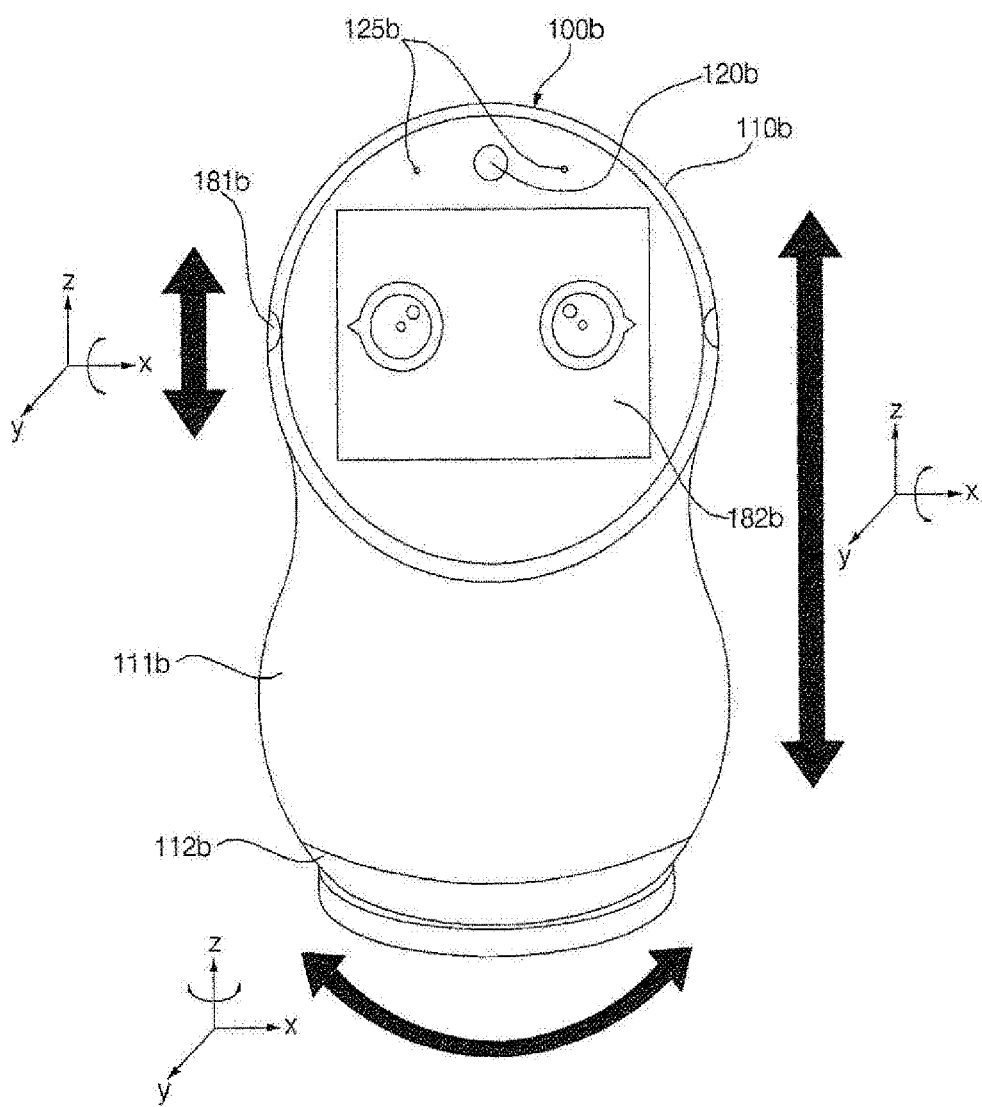
Figure 6A:
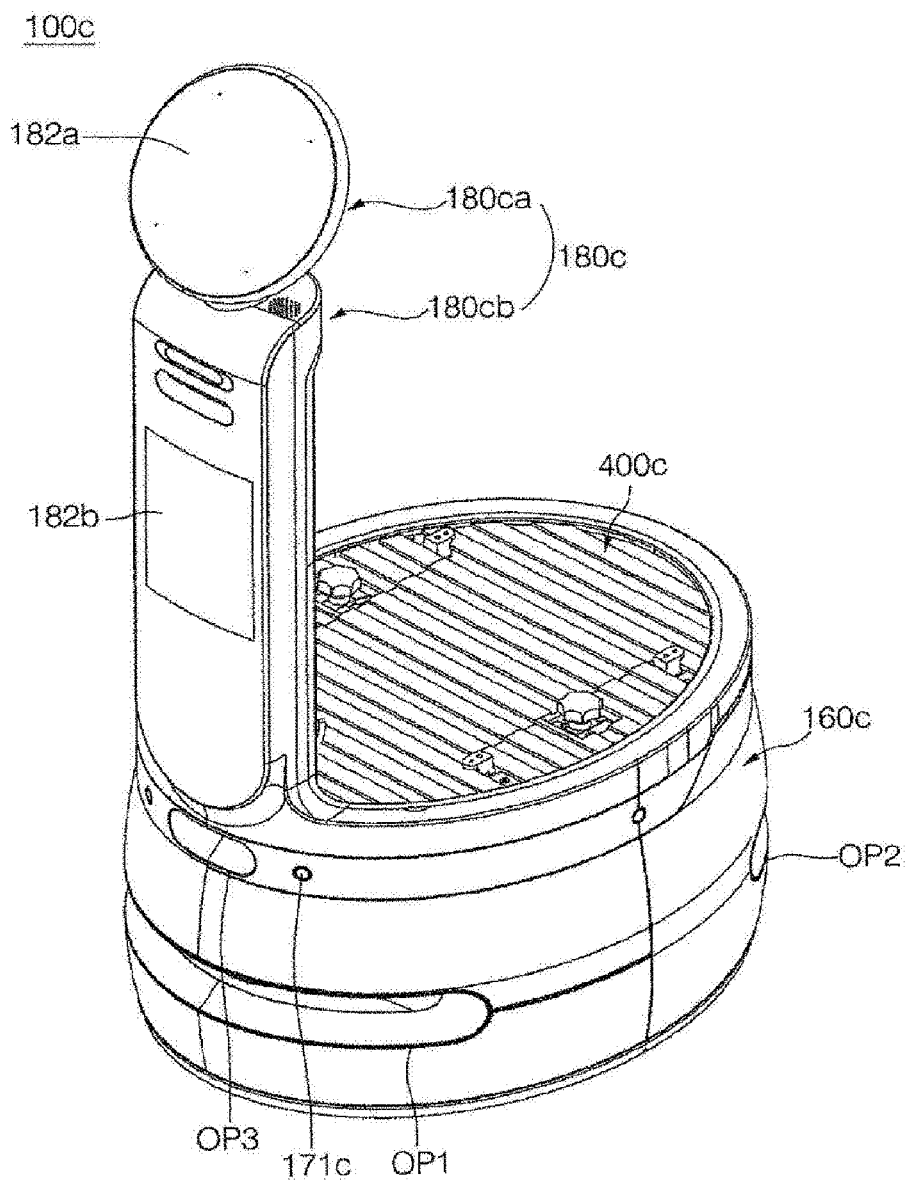
Figure 6B:
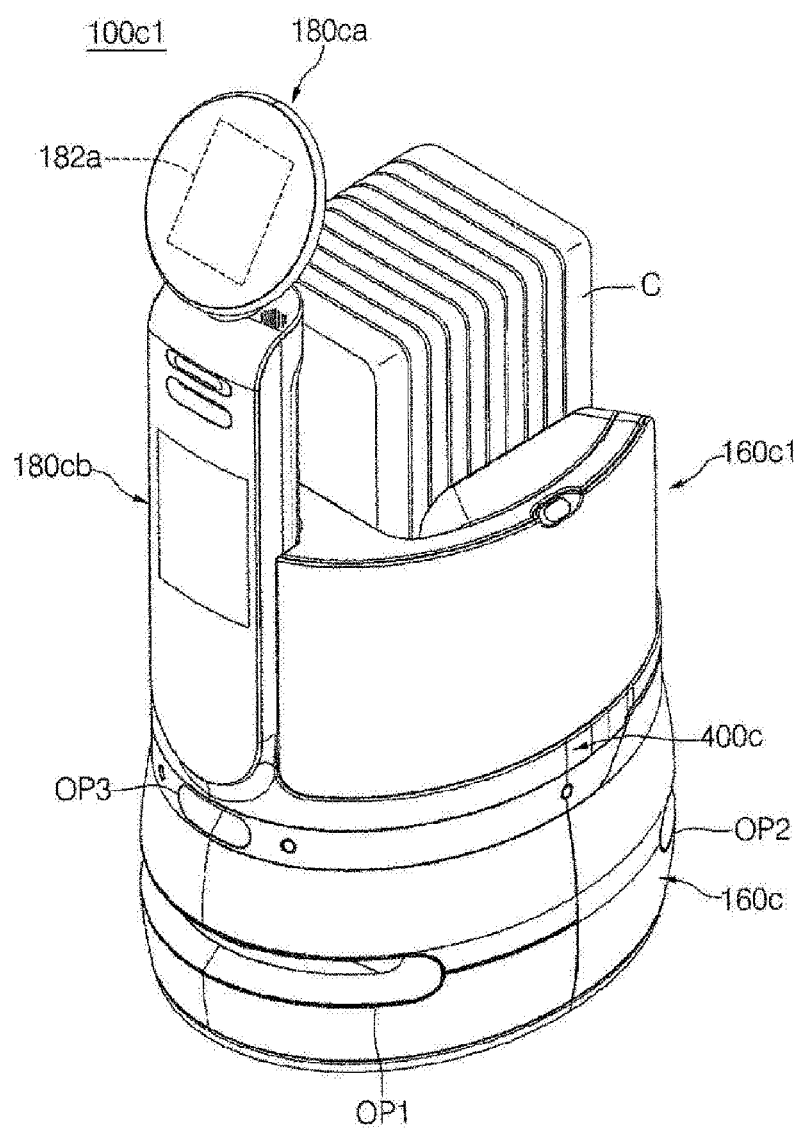
Figure 6C:
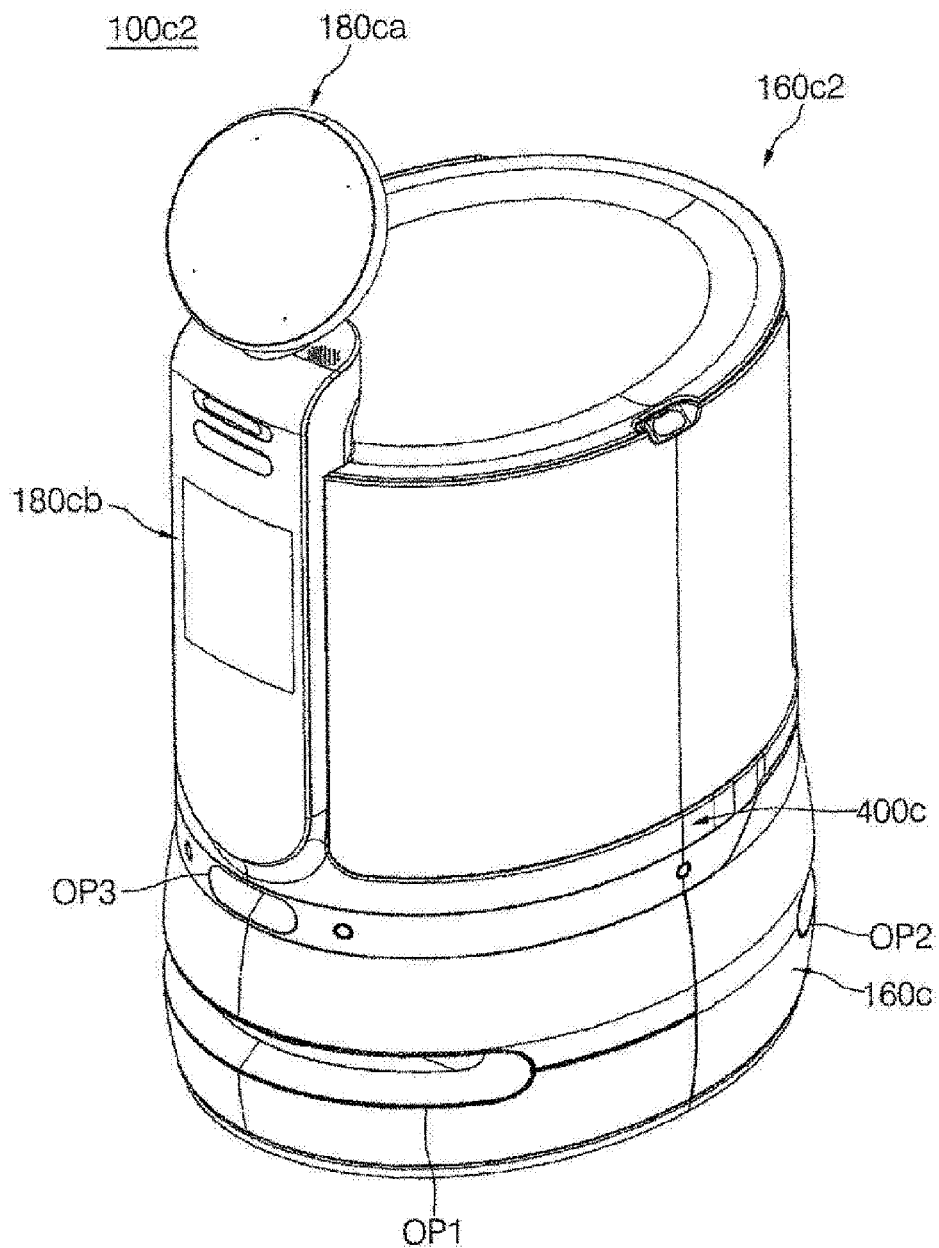
Figure 6D:
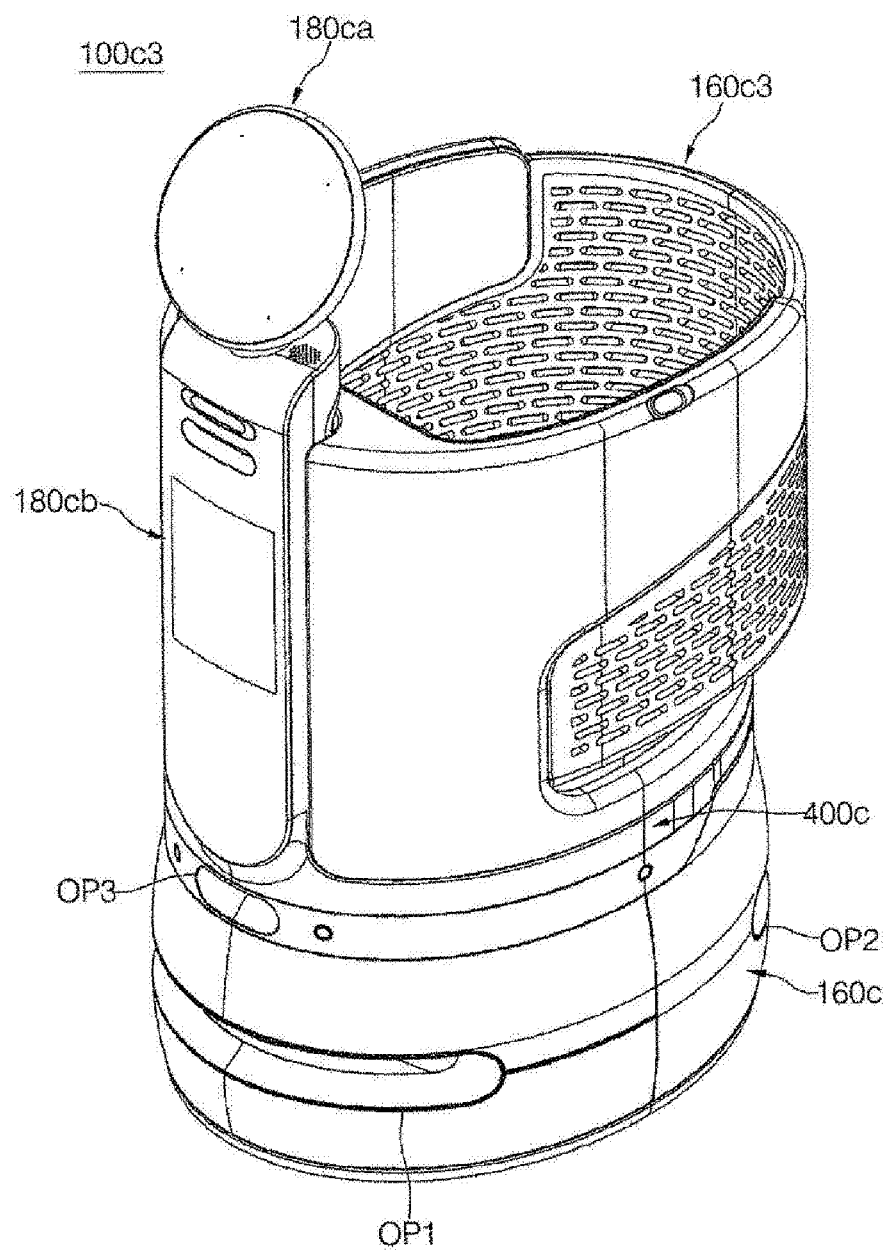

FIG. 5 is a front view showing the external appearance of a home robot according to an embodiment of the present invention.

Referring to FIG. 5, the home robot 100*b* includes main bodies 111*b* and 112*b*, which define the external appearance thereof and in which various components are received.

The main bodies 111*b* and 112*b* may include a body 111*b*, which defines a space for receiving various components constituting the home robot 100*b*, and a support unit 112*b* disposed at the lower side of the body 111*b* for supporting the body 111*b*.

In addition, the home robot 100*b* may include a head 110*b* disposed at the upper side of the main bodies 111*b* and 112*b*. A display 182 for displaying an image may be disposed on the front surface of the head 110*b*.

In this specification, the forward direction may be a positive y-axis direction, the upward-downward direction may be a z-axis direction, and the leftward-rightward direction may be an x-axis direction.

The head 110*b* may be rotated about the x axis within a predetermined angle range.

When viewed from the front, therefore, the head 110*b* may nod in the upward-downward direction as if a human nodded in the upward-downward direction. For example, the head 110*b* may perform a rotation and return within a predetermined range once or more as if a human nodded in the upward-downward direction.

Meanwhile, in some embodiments, at least a portion of the front surface of the head 100*b*, on which the display 182, which may correspond to the face of the human, is disposed, may be configured to nod.

In this specification, therefore, an embodiment in which the entire head 110*b* is moved in the upward-downward direction will be described. Unless described particularly, however, the operation in which the head 110*b* nods in the upward-downward direction may be replaced by the operation in which at least a portion of the front surface of the head, on which the display 182 is disposed, nods in the upward-downward direction.

The body 111*b* may be configured to be rotatable in the leftward-rightward direction. That is, the body 111*b* may be configured to be rotatable 360 degrees about the z axis.

Also, in some embodiments, the body 111*b* may also be configured to be rotatable about the x axis within a predetermined angle range, whereby the body may move as if the body nodded in the upward-downward direction. In this case, as the body 111*b* rotates in the upward-downward direction, the head 110*b* may also be rotated about the axis about which the body 111*b* is rotated.

In this specification, therefore, the operation in which the head 110*b* nods in the upward-downward direction may include both the case in which the head 110*b* is rotated about a predetermined axis in the upward-downward direction when viewed from front and the case in which, as the body 111*b* nods in the upward-downward direction, the head 110*b* connected to the body 111*b* is also rotated and thus nods.

Meanwhile, the home robot 100*b* may include an image acquisition unit 120*b* for capturing an image of the circumference of the main bodies 111*b* and 112*b*, an image of at least a predetermined range from the front of the main bodies 111*b* and 112*b*.

The image acquisition unit 120*b*, which captures an image of the circumference of the main bodies 111*b* and 112*b* and an external environment, may include a camera module. A plurality of cameras may be provided at various positions in order to improve capture efficiency. Preferably, the image acquisition unit 120*b* may include a front camera provided at the front surface of the head 110*b* for capturing an image of the front of the main bodies 111*b* and 112*b*.

In addition, the home robot 100*b* may include a speech input unit 125*b* for receiving user speech input.

The speech input unit 125*b* may include or may be connected to a processing unit for converting analog sound into digital data such that a user speech input signal can be recognized by the server 10 or the controller 140.

The speech input unit 125*b* may include a plurality of microphones in order to improve accuracy in receiving user speech input and to determine the location of a user.

For example, the speech input unit 125*b* may include at least two microphones.

The microphones (MIC) may be disposed at different positions so as to be spaced apart from each other, and may acquire and convert an external audio signal including a speech signal into an electrical signal.

Meanwhile, at least two microphones, which are input devices, are required to estimate a sound source from which sound is generated and the orientation of a user. As the physical distance between the microphones increases, resolution (angle) in detecting the direction increases. In some embodiments, two microphones may be disposed at the head 110*b*. In addition, two microphones may be further disposed at the rear surface of the head 110*b*, whereby it is possible to determine the location of the user in a three-dimensional space.

In addition, sound output units 181*b* may be disposed at the left and right surfaces of the head 110*b* in order to output predetermined information as sound.

Meanwhile, the external appearance and structure of the robot exemplarily shown in FIG. 5 are illustrative, and the present invention is not limited thereto. For example, the entire robot 110 may tilt or swing in a specific direction, unlike the rotational direction of the robot 100 exemplarily shown in FIG. 5.

FIGS. 6*a* to 6*d* exemplarily show delivery robots 100*c*, 100*c*1, 100*c*2, and 100*c*3 capable of delivering predetermined articles.

Referring to the figures, the delivery robots 100*c*, 100*c*1, 100*c*2, and 100*c*3 may move in an autonomous traveling mode or in a following traveling mode, and each of the delivery robots may move to a predetermined place while carrying a load, an article, or a carrier C. Depending on circumstances, each of the delivery robots may also provide an escort service of guiding a user to a specific place.

Meanwhile, the delivery robots 100*c*, 100*c*1, 100*c*2, and 100*c*3 may autonomously travel at specific places in order to guide people to specific positions or to deliver loads, such as baggage.

In addition, the delivery robots 100*c*, 100*c*1, 100*c*2, and 100*c*3 may follow users while maintaining a predetermined distance from the users.

In some embodiments, each of the delivery robots 100*c*, 100*c*1, 100*c*2, and 100*c*3 may include a weight sensor for sensing the weight of a load to be delivered, and may inform the user of the weight of the load sensed by the weight sensor.

A modular design may be applied to each of the delivery robots 100c, 100c1, 100c2, and 100c3 in order to provide services optimized depending on use environment and purpose.

For example, the basic platform 100c may include a traveling module 160c, which takes charge of traveling and includes wheels and a motor, and a UI module 180c, which takes charge of interaction with a user and includes a display, a microphone, and a speaker.

Referring to the figures, the traveling module 160c may include one or more openings OP1, OP2, and OP3.

The first opening OP1 is formed in the traveling module 160c such that a front lidar (not shown) is operable, and may extend from the front to the side of the outer circumferential surface of the traveling module 160c.

The front lidar may be disposed in the traveling module 160c so as to face the first opening OP1. Consequently, the front lidar may emit a laser through the first opening OP1.

The second opening OP2 is formed in the traveling module 160c such that a rear lidar (not shown) is operable, and may extend from the rear to the side of the outer circumferential surface of the traveling module 160c.

The rear lidar may be disposed in the traveling module 160c so as to face the second opening OP2. Consequently, the rear lidar may emit a laser through the second opening OP2.

The third opening OP3 is formed in the traveling module 160c such that a sensor disposed in the traveling module, such as a cliff sensor for sensing whether a cliff is present on a floor within a traveling area, is operable.

Meanwhile, a sensor may be disposed on the outer surface of the traveling module 160c. An obstacle sensor, such as an ultrasonic sensor 171c, for sensing an obstacle may be disposed on the outer surface of the traveling module 160c.

For example, the ultrasonic sensor 171c may be a sensor for measuring the distance between an obstacle and each of the delivery robots 100c, 100c1, 100c2, and 100c3 using an ultrasonic signal. The ultrasonic sensor 171c may sense an obstacle that is near each of the delivery robots 100c, 100c1, 100c2, and 100c3.

In an example, a plurality of ultrasonic sensors 171c may be provided in order to sense obstacles that are near each of the delivery robots 100c, 100c1, 100c2, and 100c3 in all directions. The ultrasonic sensors 171c may be located along the circumference of the traveling module 160c so as to be spaced apart from each other.

In some embodiments, the UI module 180c may include two displays 182a and 182b, and at least one of the two displays 182a and 182b may be configured as a touchscreen so as to be used as an input means.

In addition, the UI module 180c may further include the camera of the image acquisition unit 120. The camera may be disposed on the front surface of the UI module 180c in order to acquire image data of a predetermined range from the front of the UI module 180c.

In some embodiments, at least a portion of the UI module 180c may be configured so as to be rotatable. For example, the UI module 180c may include a head unit 180ca rotatable in the leftward-rightward direction and a body unit 180cb for supporting the head unit 180ca.

The head unit 180ca may be rotated based on the operation mode and the current state of each of the delivery robots 100c, 100c1, 100c2, and 100c3.

In addition, the camera may be disposed at the head unit 180ca in order to acquire image data of a predetermined range in the direction in which the head 180a is oriented.

For example, in the following traveling mode, in which each of the delivery robots 100c, 100c1, 100c2, and 100c3 follows a user, the head unit 180ca may be rotated so as to face forwards. In addition, in the guide mode, in which each of the delivery robots 100c, 100c1, 100c2, and 100c3 provides an escort service of guiding a user to a predetermined destination while moving ahead of the user, the head unit 180ca may be rotated so as to face rearwards.

In addition, the head unit 180ca may be rotated so as to face a user identified by the camera.

The porter robot 100c1 may further include a delivery service module 160c1 for receiving a load in addition to the components of the basic platform 100c. In some embodiments, the porter robot 100c1 may be provided with a scanner capable of recognizing a ticket, an airline ticket, a barcode, a QR code, etc. for guide.

The serving robot 100c2 may further include a serving service module 160c2 for receiving serving articles in addition to the components of the basic platform 100c. For example, serving articles in a hotel may be towels, toothbrushes, toothpaste, bathroom supplies, bedclothes, drinks, foods, room services, or other small electronic devices. The serving service module 160c2 may be provided with a space for receiving serving articles in order to stably deliver the serving articles. In addition, the serving service module 160c2 may be provided with a door for opening and closing the space for receiving the serving articles, and the door may be manually and/or automatically opened and closed.

The cart robot 100c3 may further include a shopping cart service module 160c3 for receiving customer's shopping articles in addition to the components of the basic platform 100c. The shopping cart service module 160c3 may be provided with a scanner capable of recognizing a barcode, a QR code, etc. of each shopping article.

Each of the service modules 160c1, 160c2, and 160c3 may be mechanically coupled to the traveling module 160c and/or the UI module 180c. In addition, each of the service modules 160c1, 160c2, and 160c3 may be electrically coupled to the traveling module 160c and/or the UI module 180 in order to transmit and receive a signal. Consequently, cooperative operation is achieved.

To this end, each of the delivery robots 100c, 100c1, 100c2, and 100c3 may include a coupling unit 400c for coupling the traveling module 160c and/or the UI module 180 to a corresponding one of the service modules 160c1, 160c2, and 160c3.

FIG. 7 shows an example of a simple internal block diagram of a robot according to an embodiment of the present invention.

Referring to FIG. 7, the robot 100 according to the embodiment of the present invention may include a controller 140 for controlling the overall operation of the robot 100, a storage unit 130 for storing various kinds of data, and a communication unit 190 for transmitting and receiving data to and from another device, such as the server 10.

The controller 140 may control the storage unit 130, the communication unit 190, a driving unit 160, a sensor unit 170, and an output unit 180 in the robot 100, whereby the controller may control the overall operation of the robot 100.

The storage unit 130, which stores various kinds of information necessary to control the robot 100, may include a volatile or nonvolatile recording medium. Examples of the recording medium, which stores data readable by a microprocessor, may include a hard disk drive (HDD), a solid state disk (SSD), a silicon disk drive (SDD), a ROM, a RAM, a CD-ROM, a magnetic tape, a floppy disk, and an optical data storage device.

Meanwhile, the controller 140 may perform control such that the operation state of the robot 100 or user input is transmitted to the server 10 through the communication unit 190.

The communication unit 190 may include at least one communication module, through which the robot 100 may be connected to the Internet or to a predetermined network and may communicate with another device.

In addition, the communication unit 190 may be connected to a communication module provided in the server 10 in order to process transmission and reception of data between the robot 100 and the server 10.

The robot 100 according to the embodiment of the present invention may further include a speech input unit 125 for receiving user speech input through a microphone.

The speech input unit 125 may include or may be connected to a processing unit for converting analog sound into digital data such that a user speech input signal can be recognized by the controller 140 or the server 10.

Meanwhile, the storage unit 130 may store data for speech recognition, and the controller 140 may process the user speech input signal received through the speech input unit 125, and may perform a speech recognition process.

Meanwhile, the speech recognition process may be performed by the server 10, not by the robot 100. In this case, the controller 140 may control the communication unit 190 such that the user speech input signal is transmitted to the server 10.

Alternatively, simple speech recognition may be performed by the robot 100, and high-dimensional speech recognition, such as natural language processing, may be performed by the server 10.

For example, in the case in which speech input including a predetermined keyword is received, the robot 100 may perform the operation corresponding to the keyword, the speech input excluding the keyword may be performed through the server 10. Alternatively, the robot 100 may perform merely wake-up word recognition for activating a speech recognition mode, and subsequent speech recognition of the user speech input may be performed through the server 10.

Meanwhile, the controller 140 may perform control such that the robot 100 performs a predetermined operation based on the result of speech recognition.

Meanwhile, the robot 100 may include an output unit 180 in order to display predetermined information in the form of an image or to output the predetermined information in the form of sound.

The output unit 180 may include a display 182 for displaying information corresponding to user command input, processing result corresponding to the user command input, the operation mode, the operation state, and the error state in the form of an image. In some embodiments, the robot 100 may include a plurality of displays 182.

In some embodiments, at least some of the displays 182 may be connected to a touchpad in a layered structure so as to constitute a touchscreen. In this case, the display 182 constituting the touchscreen may also be used as an input device for allowing a user to input information by touch, in addition to an output device.

In addition, the output unit 180 may further include a sound output unit 180 for outputting an audio signal. The sound output unit 180 may output an alarm sound, a notification message about the operation mode, the operation state, and the error state, information corresponding to user command input, and a processing result corresponding to the user command input in the form of sound under the control of the controller 140. The sound output unit 180 may convert an electrical signal from the controller 140 into an audio signal, and may output the audio signal. To this end, a speaker may be provided.

In some embodiments, the robot 100 may further include an image acquisition unit 120 for capturing an image of a predetermined range.

The image acquisition unit 120, which captures an image of the periphery of the robot 100, an external environment, etc., may include a camera module. For capture efficiency, a plurality of cameras may be installed at predetermined positions.

The image acquisition unit 120 may capture an image for user recognition. The controller 140 may determine an external situation or may recognize a user (a target to be guided) based on the image captured by the image acquisition unit 120.

Also, in the case in which the robot 100 is a mobile robot, i.e. one of the guide robot 100a, the delivery robots 100c, 100c1, 100c2, and 100c3, and the cleaning robot 100d, the controller 140 may perform control such that the robot 100 travels based on the image captured by the image acquisition unit 120.

Meanwhile, the image captured by the image acquisition unit 120 may be stored in the storage unit 130.

In the case in which the robot 100 is a mobile robot, i.e. one of the guide robot 100a, the delivery robots 100c, 100c1, 100c2, and 100c3, and the cleaning robot 100d, the robot 100 may further include a driving unit 160 for movement. The driving unit 160 may move the main bodies under the control of the controller 140.

The driving unit 160 may include at least one driving wheel (not shown) for moving the main bodies of the robot 100. The driving unit 160 may include a driving motor (not shown) connected to the driving wheel for rotating the driving wheel. Driving wheels may be provided at left and right sides of the main bodies, and will hereinafter be referred to as a left wheel and a right wheel.

The left wheel and the right wheel may be driven by a single driving motor. If necessary, however, a left wheel driving motor for driving the left wheel and the right wheel driving motor for driving the right wheel may be individually provided. The direction in which the main body travels may be changed to the left or to the right based on the difference in the rotational speed between the left wheel and the right wheel.

An immobile robot 100, such as the home robot 100b, may include a driving unit 160 for performing a predetermined action, as described with reference to FIG. 5.

In this case, the driving unit 160 may include a plurality of driving motors (not shown) for rotating and/or moving the body 111b and the head 110b.

Meanwhile, the robot 100 may include a sensor unit 170 including sensors for sensing various kinds of data related to the operation and state of the robot 100.

The sensor unit 170 may further include an operation sensor for sensing the operation of the robot 100 and outputting operation information. For example, a gyro sensor, a wheel sensor, or an acceleration sensor may be used as the operation sensor.

The sensor unit 170 may include an obstacle sensor for sensing an obstacle. The obstacle sensor may include an infrared sensor, an ultrasonic sensor, an RF sensor, a geomagnetic sensor, a position sensitive device (PSD) sensor, a cliff sensor for sensing whether a cliff is present on a floor within a traveling area, and a lidar (light detection and ranging).

Meanwhile, the obstacle sensor senses an object, particularly an obstacle, present in the direction in which the mobile robot 100 travels (moves), and transmits information about the obstacle to the controller 140. At this time, the controller 140 may control the motion of the robot 100 depending on the position of the sensed obstacle.

Figure 8:
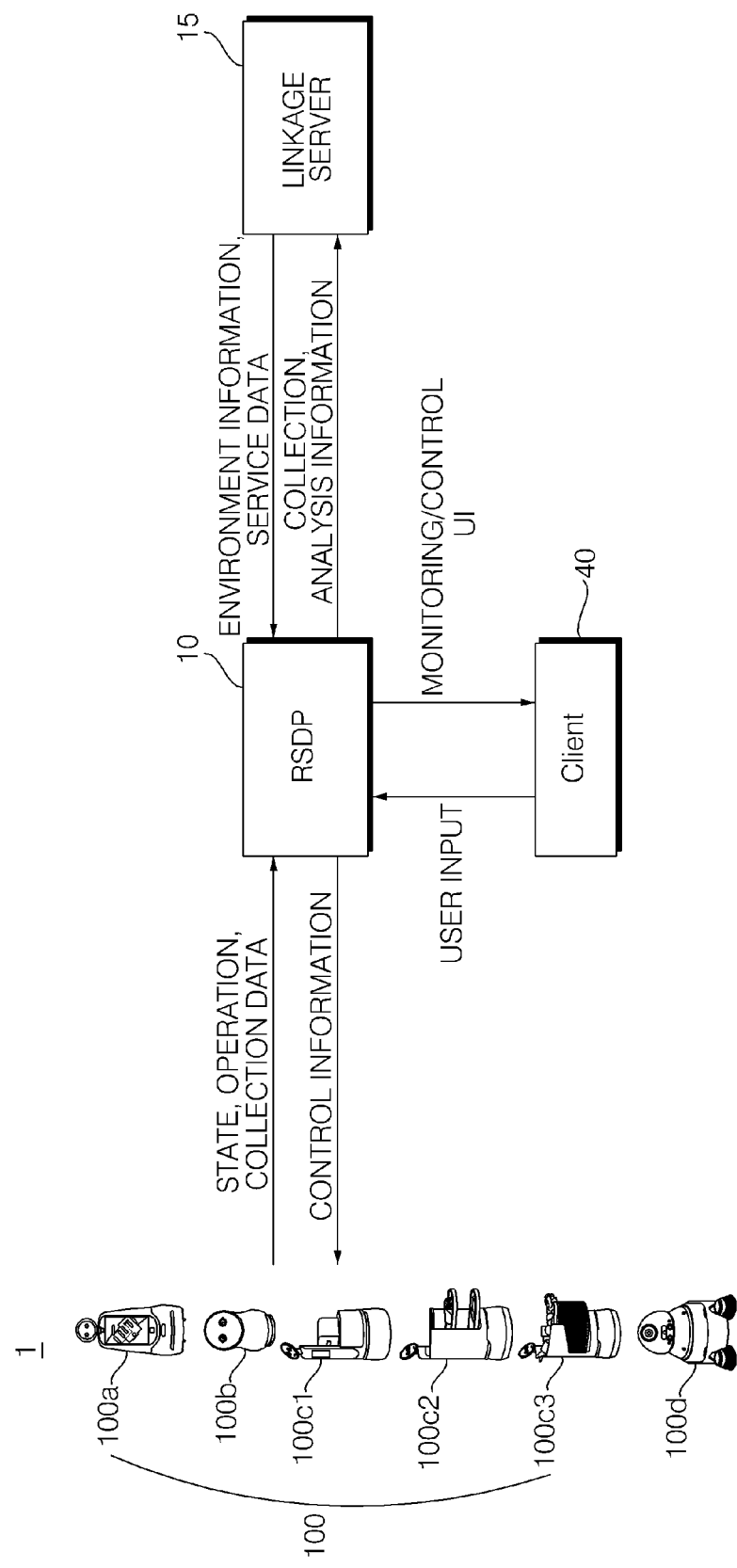
FIG. 8 is a reference view illustrating a robot system including a server according to an embodiment of the present invention.

FIG. 8 is a reference view illustrating a robot system including a server according to an embodiment of the present invention.

FIG. 8 shows an example of data transmitted and received between a server 10, robots 100, a client 40, and a linkage server 15 in the robot system including a server according to an embodiment of the present invention. Although not described separately, the robot system may equally include the features of the robot system described with reference to FIGS. 1 to 7.

Referring to FIG. 8, the robot system according to the embodiment of the present invention may include a plurality of robots 100 and a server 10 that communicates with the robots 100 and monitors and controls the state of the robots 100.

As described above with reference to FIGS. 1 to 7, the robot system 1 according to the embodiment of the present invention may include at least one of a guide robot 100a, a home robot 100b, delivery robots 100c, or a cleaning robot 100d.

More preferably, the robots 100 include different kinds of robots. That is, the robot system according to the embodiment of the present invention may include two or more kinds of robots.

For example, the robot system 1 according to the embodiment of the present invention may include two or more kinds of robots selected from among a guide robot 100a, a home robot 100b, a porter robot 100c1, a serving robot 100c, a cart robot 100c3, and a cleaning robot 100d.

Meanwhile, the robots 100 may transmit state information, operation information, and data acquired during the operation thereof to the server 10. For example, the robots 100 may communicate with the server 10 in order to transmit and receive various kinds of information.

For example, when the state of the robots 100 is changed, the robots 100 may inform the server 10 of a change in the state thereof. In addition, the robots 100 may periodically inform the server of the current state thereof.

In addition, the robots 100 may transmit information about tasks that have been performed thereby to the server 10.

In addition, the robots 100 may transmit image data acquired through the image acquisition unit 120 during the operation thereof, sensing data acquired through the sensor unit 170, and collection data such as map information generated during traveling thereof to the server 10.

In addition, the robots 100 may receive user input requesting a predetermined service, and may transmit data related to the user input to the server 10.

Meanwhile, the server 10 may control the robots 100, and may monitor the state of the robots 100 and the process in which the robots are performing tasks.

In addition, the server 10 may provide various kinds of data related to the performance of tasks to the robots 100, and may update data and setting information stored in the robots 100.

Meanwhile, as described with reference to FIGS. 2a and 2b, the server 10 according to the embodiment of the present invention may include a control server 11 that communicates with the robots 100 and monitors and controls the state of the robots 100. In this case, the robots 100 may communicate with the control server 11 in order to transmit and receive various kinds of information.

Meanwhile, the server 10 may transmit and receive information to and from the linkage server 15, such as a server of a service provider who provides a service using products and robots, e.g. an airport, a hotel, or a mart, or a server of a content provider who provides weather, map data, music, or movies.

In this case, the server 10 may receive environment information of a place at which a service is provided, such as an airport, a hotel, or a mart, from the linkage server 15, and may transmit information necessary to perform tasks to the robots 100.

In addition, the server 10 may receive content data, such as weather, map data, music, or movies, from the linkage server 15, and may transmit the received content data to predetermined ones of the robots 100 for update.

Depending on circumstances, the map data may be received from a server of a service provider or from a server of a special map company. In addition, the server 10 may receive map data (e.g. SLAM map data) generated by the robots 100 during traveling thereof from the robots 100 separately from map data received from the linkage server 15. In this case, the server 10 may collect the map data transmitted by the robots 100 to generate more accurate map data, and may update the map data of the robots 100.

Meanwhile, the server 10 may provide a user interface related to the robots to the client 40, and may control the robots 100 according to user input through the client 40.

The server 10 may include a control server 11 that administrates and controls the robots while communicating with the client 40 through a web browser 41 or an application 42 of a mobile terminal.

In some embodiments, the server 10 may further include a device administration server 12 that relays and administrates data related to the robots 100.

Meanwhile, the control server 11 may include a control/service server 11a that provides a control service capable of monitoring the state and location of the robots 100 and administrating content and task schedules based on user input received from the client 40 and an administrator application server 11b that a control administrator is capable of accessing through the web browser 41.

The control/service server 11a may include a database, and may respond to a service request from the client 40, such as robot administration, control, firmware over the air (FOTA) upgrade, and location inquiry.

The control administrator may access the administrator application server 11b under the authority of the administrator, and the administrator application server may administrate functions related to the robot, applications, and content.

The server 10 may provide robot control, content administration, schedule administration, and data collection/analysis functions to the client 40. In addition, the server 10 may provide an interface capable of using these functions to the client 40.

For example, the robot control function may include robot device administration functions, such as robot device profile administration and firmware administration, robot monitoring functions, such as confirmation of the state of all robots, e.g. an operation mode and an error, and confirmation of the current location and state of each robot, and robot control functions, such as robot power off, rebooting, and position movement.

For example, the content administration may support a function for reflecting information related to an image, text, and a map appropriate for the situation of a B2B customer in the robots in a timely manner, and may upload and apply resources (text, images, video, etc.) necessary for a robot device application in the form of a file so as to be suitable for a system environment.

For example, the schedule administration function may set and administrate tasks of the robots, and may support robot-based and time-zone-based task administration.

The data collection/analysis function may collect and statistically process robot (device) data. For example, the data collection/analysis function may collect and statistically process state data, such as an error, an operation mode, an operation time, and a traveling distance, and service data, such as the number of provisions of each service and the provision time of each service.

Depending on circumstances, the server 10 may share the collected information, the analyzed information, and the statistically processed information with the linkage server 15.

Meanwhile, the server 10 may provide an integrated user interface including information about the different kinds of robots to the client 40.

Here, the integrated user interface may include entire robot status information and robot-kind-based state information classified depending on the kind of robots. In this case, robot-kind-based state information may include a robot kind title item, a current state title item, and robot number information corresponding to the current state title item, and the current state title item and the robot number information may be displayed in different colors depending on the state thereof.

Consequently, it is possible to intuitively check the state of robots.

In addition, the integrated user interface may further include location status information, in which the current locations of robots are displayed on a map, and individual robot state information.

Meanwhile, the server 10 may provide entire statistical data based on data gathered from all robots, kind-based statistical data based on data gathered from the same kind of robots, and individual statistical data based on data received from individual robots.

In addition, the server 10 may provide function- or service-based statistical data based on data gathered from robots capable of performing predetermined functions or services.

Conventionally, individual robots are controlled separately. In addition, even in the case in which a robot control system for a plurality of robots is constructed, a dedicated control system is constructed depending on a specific kind of robot.

In the case in which different kinds of robots are used, therefore, a plurality of robot control systems is used, whereby it is not possible to efficiently administrate different kinds of robots having different features, functions, and performances. As a result, it is not possible to combine different kinds of robots in order to provide the optimum service.

However, the server 10 according to the present invention may provide an integrated user interface including information about the different kinds of robots to the client 40, whereby it is possible to administrate and control two or more kinds of robots using a single control system and a single user interface.

Consequently, it is possible to provide various kinds of services using a plurality of robots, thereby improving use convenience, and to efficiently provide the optimum service using different kinds of robots.

In addition, it is possible to realize a low-cost, high-efficiency cooperation system between robots capable of minimizing the intervention of an administrator, and it is possible to select a combination suitable for the place at which a service is provided and the kind of the service in order to provide the service using a minimum number of robots.

Conventionally, a storage medium, such as a USB memory, may be connected to each robot in order to input or update data. As a result, content necessary to the robot, such as new customers, a language at the time of generation of information, a log, a map, and a picture frame, is manually loaded, which is inefficient.

However, the server 10 according to the embodiment of the present invention and the robot system 1 including the same may conveniently update data related to a plurality of robots.

Upon receiving data from the linked external server 15, the server 10 may update data of robots related to the received data, among the plurality of robots, in a bundle.

For example, upon receiving map data and data based on geographical information from the external server 15, the server 10 may update map data of the mobile robots, such as the guide robot 100*a*, the delivery robot 100*c*, and the cleaning robot 100*d*.

In some embodiments, the server 10 may further include a map server 14 that provides map data and data based on geographical information.

In addition, the server 10 may automatically receive data from the linked external server 15 in a predetermined cycle, and may update data of the robots related to the received data in a bundle.

For example, even though a user does not separately perform update input, the server 10 may automatically communicate with the linked external server 15 in a predetermined cycle, for example, every day, every week, or every month, in order to determine whether there are data to be updated, and upon determining that there are data to be updated, may receive the data to be updated in order to update the data of the robots 100.

As described with reference to FIG. 2*b*, the server 10 according to the present invention may include common units 4*a* and 4*b* including functions and services that are commonly applied to the robots 100 and a dedicated unit 4*c* including specialized functions related to at least some of the robots 100 so as to be modularized.

According to the present invention, the common functions of the common units 4*a* and 4*b* of the platform may be utilized when new projects of various domains are generated, whereby it is possible to reduce a development period and to deal with the projects based on content and schedule administration through the server 10 in a timely manner.

In this case, the server 10 may apply data uploaded in the common units 4*a* and 4*b* to all of the robots 100, and may apply data uploaded in the dedicated unit 4*c* to robots corresponding to the dedicated unit 4*c* in which the data are uploaded. In this case, a plurality of dedicated units 4*c* may be provided so as to correspond to the kind of robots.

FIGS. 9 to 15 are reference views illustrating user interface screens of the robot system according to the embodiment of the present invention, wherein the user interface screens are provided from the server to the client and are displayed on a display means of the client.

Figure 9:
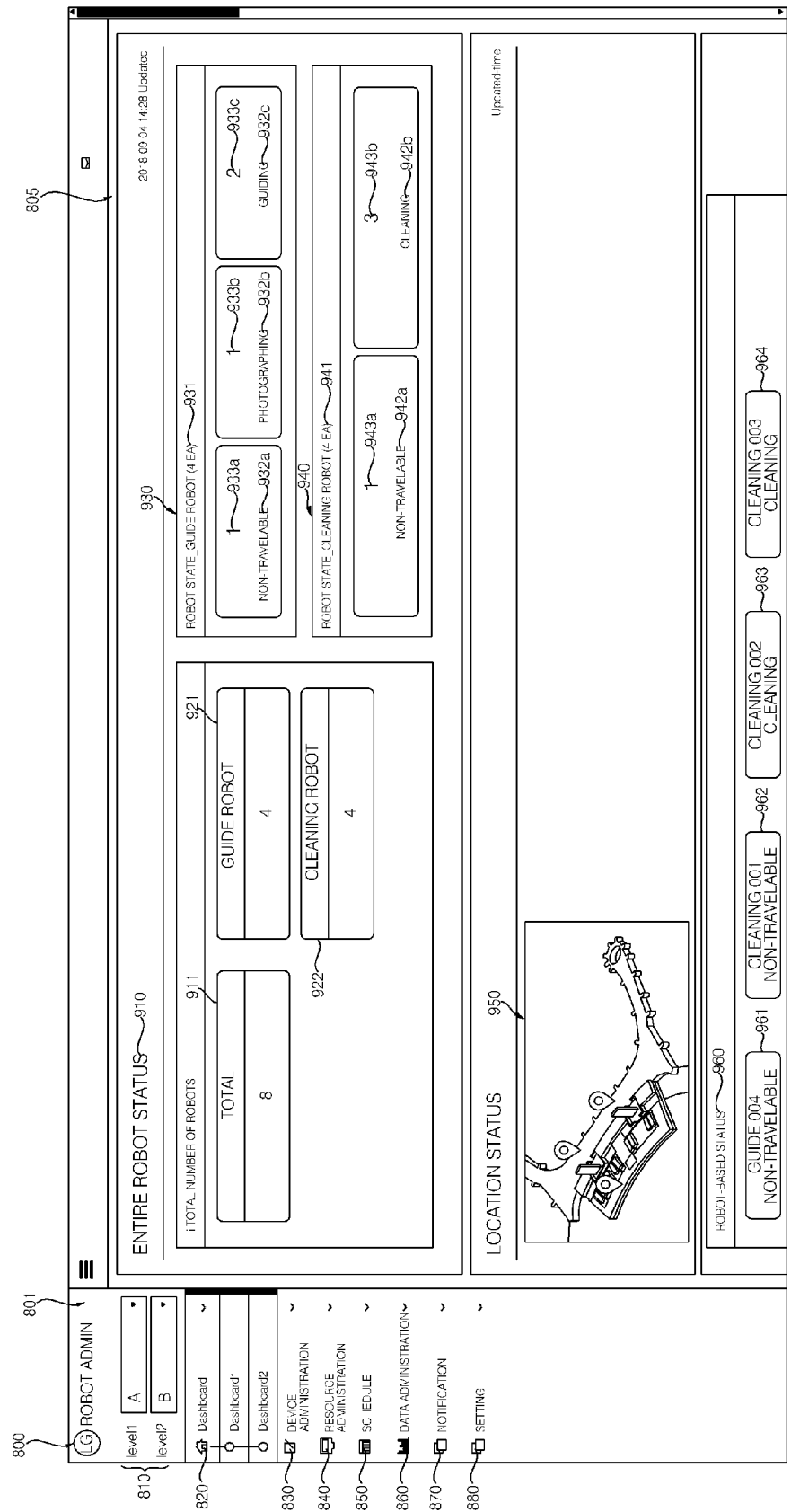
FIGS. 9 to 15 are reference views illustrating user interface screens of the robot system according to the embodiment of the present invention.

Referring to FIG. 9, a user interface screen 800 may include a menu area 801, in which upper-level menu items 810 and 890 are disposed, and an information area 805, in which a screen corresponding to a selected one of the upper-level menu items is displayed. The user interface screen 800 may be web based.

FIG. 9 exemplarily shows the case in which the information area 805 is disposed at the right side of the menu area 801. However, the present invention is not limited thereto. For example, the menu area 801 may be disposed at the upper side, and the information area 805 may be disposed at the lower side.

Meanwhile, the server 10 according to the present invention and the robot system 1 including the same may provide a complete solution ranging from an application programming interface (API) to a web front as well as the robots 100.

A web front screen used by a user may be called "ROBOT ADMIN." The main features of ROBOT ADMIN are remote robot control, resource administration, robot task schedule administration, and robot data administration. The upper-level menu items 810 and 890 for these may be disposed in the menu area 801.

For example, authority information item 810 of a user accessing the ROBOT ADMIN web user interface screen 800, a dashboard item 820 capable of checking state information of the robots, a robot device administration item 830 that administrates a robot device profile, a resource (test, images, video, etc.) administration item 840 necessary for a robot device application, a schedule item 850 that sets and checks task schedules of the robots, a data administration item 860 capable of administrating task performance data of the robots and various kinds of data acquired by the robots, a notification item 870 capable of checking various kinds of notification information, and a setting item 880 capable of inputting and checking various settings may be included.

FIG. 9 exemplarily shows the case in which the dashboard item 820 is selected and a dashboard screen 900 is displayed in the information area 805.

The dashboard screen 900, which is a kind of home screen, may be a default screen display at the time of user access. In some embodiments, a predetermined screen, such as a welcome screen or an official announcement screen, may be displayed before a main screen including the upper-level menu items 810 and 890 is provided.

The dashboard screen 900 may dispose various kinds of information about robots in a single screen in order to provide basic information necessary for a user. Consequently, it is possible to minimize the manipulation of a user, such as an administrator for monitoring information about the robots.

More preferably, the dashboard screen 900 is an integrated user interface including information about different kinds of robots. For example, the dashboard screen 900 may include information about two or more kinds of robots.

Referring to FIG. 9, the dashboard screen 900 may include entire robot status information 910 and robot-kind-based state information 930 and 940 classified depending on the kind of robots.

The entire robot status information 910 may include information about the total number of robots 911 and kind-based robot number information 921 and 922. FIG. 9 exemplarily shows the case in which the robot system includes two kinds of robots, such as a guide robot 100a and a cleaning robot 100d. The kind-based robot number information 921 and 922 may include information about the number of guide robots 921 and information about the number of cleaning robots 922.

Meanwhile, the robot-kind-based state information 930 and 940 may include robot kind title items 931 and 941, current state title items 932a, 932b, 932c, 942a, and 942b, and robot number information 933a, 933b, 933c, 943a, and 943b corresponding to the current state title items.

For example, one robot (933a) that cannot travel (932a), one robot (933b) that is capturing an image (932b), and two robots (933c) that are guiding (932c) are shown under the guide robot title item 931, whereby it is possible to check the state information of the guide robots 100a included in the robot system 1 through the guide robot state information 930.

In addition, one robot (943a) that cannot travel (942a) and three robots (943b) that are cleaning (942b) are shown under the cleaning robot title item 932, whereby it is possible to check the state information of the cleaning robots 100d included in the robot system 1 through the cleaning robot state information 940.

Meanwhile, the current state title items 932a, 932b, 932c, 942a, and 942b, and the robot number information 933a, 933b, 933c, 943a, and 943b may be displayed in different colors depending on the state thereof.

Alternatively, the title item and number information corresponding to at least one state and the title item and number information corresponding to another state may be displayed in different colors.

For example, the non-travelable state title items 932a and 942a and the number information 933a and 943a may be displayed in red.

Consequently, a user may intuitively check the state of robots.

In addition, the dashboard screen 900 may further include location status information 950, in which the current locations of robots are displayed on a map, and individual robot state information 960.

The individual robot state information 960 may include robot-based items 961, 962, 963, and 964 including text and/or a graphical object indicating identification information and state information of each robot.

The individual robot state information 960 may be disposed at the lowermost end of the dashboard screen 900. The entirety of the individual robot state information 960 may not be included in a single screen depending on the number of robots used in the robot system 1. In this case, a user may scroll the dashboard screen 900 downwards in order to check at least some of the individual robot state information 960.

Figure 10:
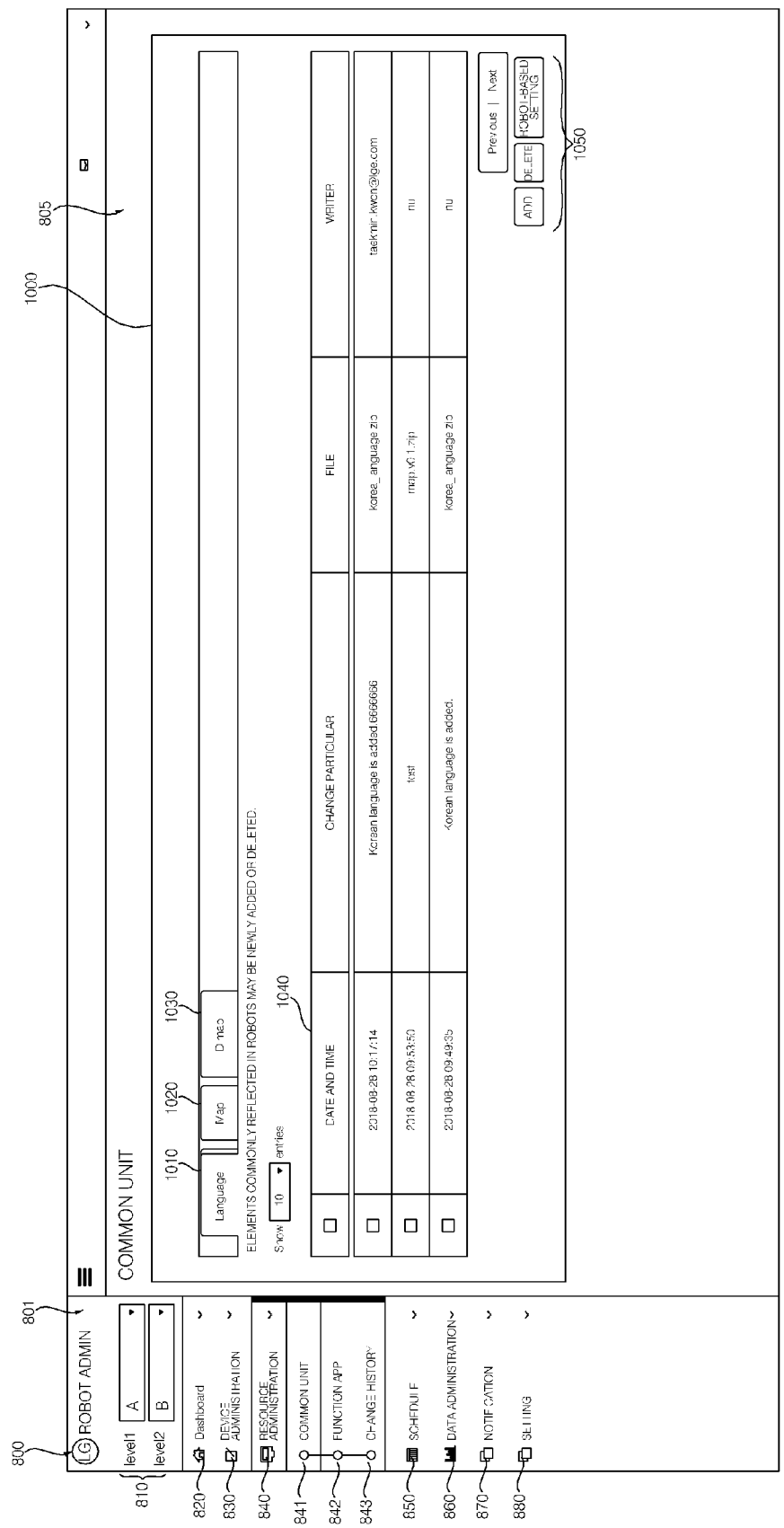

FIG. 10 exemplarily shows the case in which the resource administration item 840 is selected and a content administration screen 1000 is displayed in the information area 805.

Referring to FIG. 10, the resource administration item 840 may include a common unit item 841 that administrates content data related to common functions and services of the robots, a function application item 842 that administrates each function application of the robots, and a change history item 843 capable of checking a resource change history.

A user may select the common unit item 841, and may add, delete, or change elements that are commonly reflected in the robots.

For example, common elements corresponding to a robot language item 1010, a map 1 item 1020, and a map 2 item 1030 included in the common unit item 841 may be updated in a bundle. At least some pieces of information of the map 1 item 1020 and the map 2 item 1030 may correspond to other map data.

For example, some pieces of information included in the map 1 item 1020 and the map 2 item 1030 may be different from each other, and map generation subjects may be different from each other.

Depending on circumstances, the map 2 item 1030 may include map data and geographical information received from the linkage server 15.

Here, the linkage server 15 may be a server of a special map/point of interest (POI) third party. The server 10 according to the embodiment of the present invention may periodically acquire a map file through linkage between a special map measurement solution company and an API-based cloud. In particular, the map and POI information uploaded in the robot control server 11 may be reflected in a bundle.

Consequently, it is not necessary for the administrator to individually edit the map and the POI.

According to an embodiment of the present invention, it is possible to provide extensibility through linkage between another solution, such as a map measurement solution or position-based advertising, and a cloud. For example, it is possible to provide extensibility using an external service through server-to-server linkage between the server 10 and a server 15 of a special map measurement solution company.

Conventionally, when the map/POI is changed, the administrator performs editing one by one. In the embodiment of the present invention, however, it is possible to flexibly deal with the request of a customer company through linkage with map/POI information using a special solution such that it is not necessary for the administrator to directly edit the map or the POI.

In addition, the server 10 according to the embodiment of the present invention may provide a customized service to a customer company through linkage with a third party solution that provides another content service in addition to a map.

Referring to FIG. 10, the user may select the language item 1010, and may check a language-related change particular 1040. In addition, the user may select a lower-level menu 1050, and may perform update by adding, deleting, or changing language-related data of all robots in a bundle.

Figure 11:
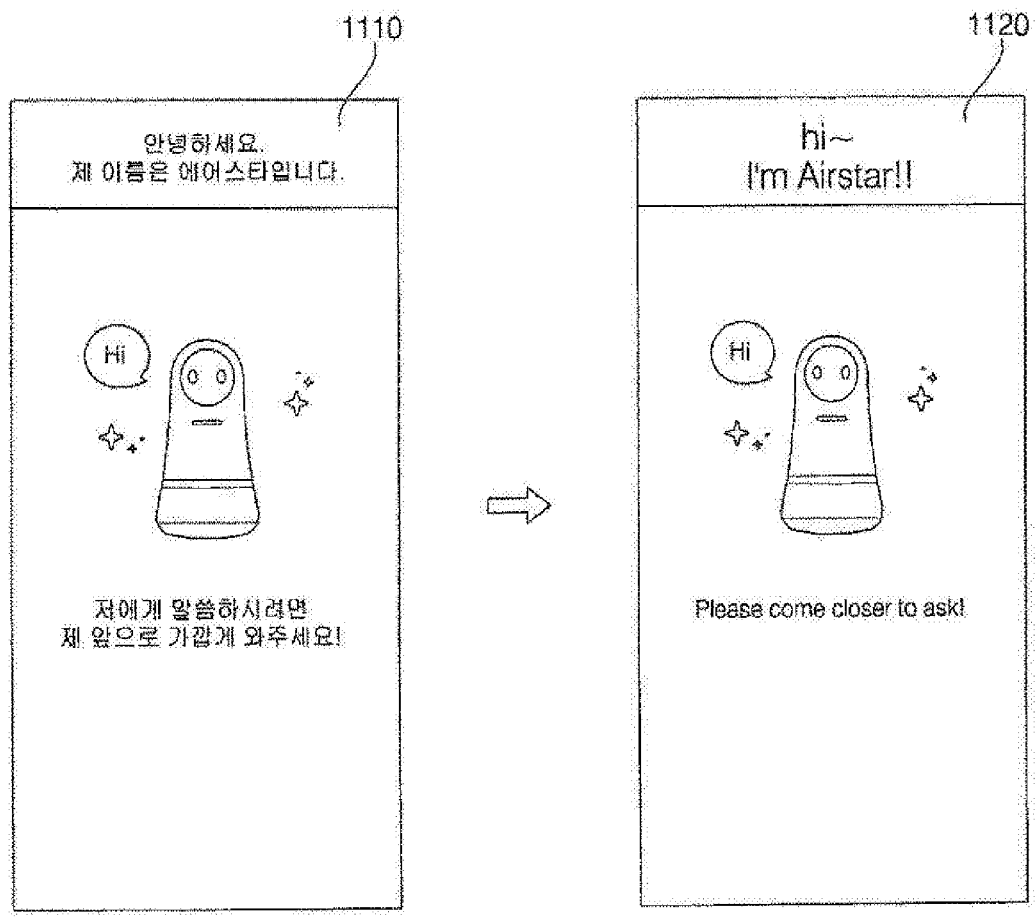

FIG. 11 shows an example in which a guide screen of the guide robot 100a is changed in the case in which the use language is changed from Korean to English.

Referring to FIG. 11, the guide robot 100a, which displays a guide screen 1110 in Korean, may display a guide screen 1120 in English according to a change in the use language of all robots. Subsequently, all robots, including the guide robot 100a, may display the guide screen in English until the use language is changed.

Figure 12:
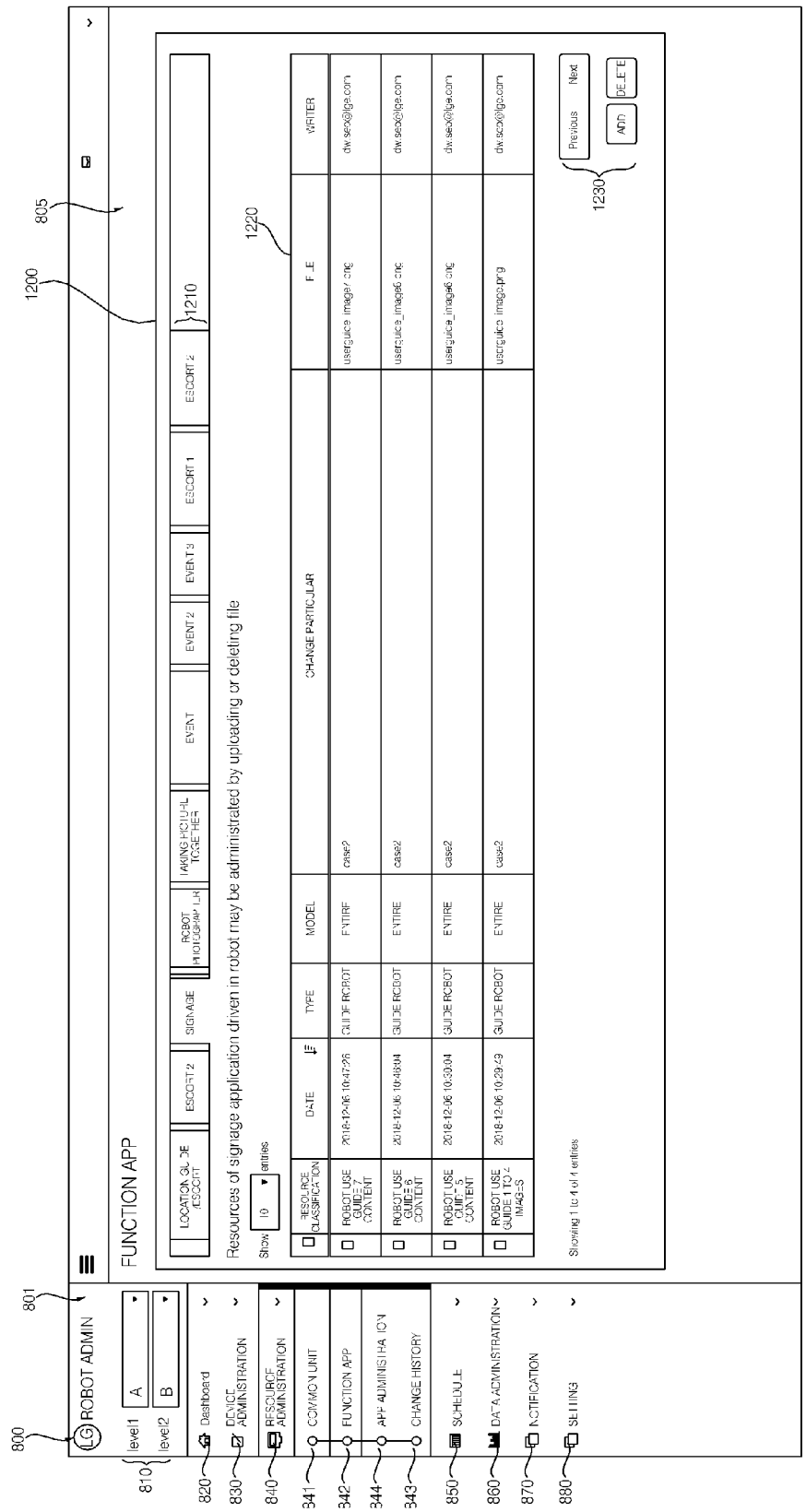

FIG. 12 exemplarily shows the case in which the function application item 842 is selected and an application administration screen 1200 is displayed in the information area 805.

When the function application item 842 is selected, the application administration screen 1200, including a category tab menu 1210 corresponding to each function application of the robots, may be displayed.

The category tab menu 1210 may include items corresponding to respective function applications, such as location guide/escort, signage, a robot photographer, taking a picture together, and an event.

FIG. 12 exemplarily shows the case in which the signage item is selected. The signage item is a menu item capable of administrating resources of a signage application driven in a robot by uploading or deleting a file.

Meanwhile, the signage application is an application in which the guide robot 100a displays an image or video on a large-sized display. A user may select the signage item, and may check a signage-application-related change particular 1220. In addition, the user may select a lower-level menu 1230, and may perform update by adding, deleting, or changing the image and video data of the signage application in a bundle.

The content updated in the signage application, such as the image and video data, may be applied to the robots 100, such as the guide robot 100a, so as to be reproduced all the time or under a specific condition.

In addition, the signage application may be linked with an advertising solution company in order to provide high-level advertising service including an additional service, such as advertising content generation or advertising effect measurement.

Meanwhile, the menu items included in the integrated user interface and the detailed screens corresponding to the respective menu items may be variously changed.

For example, the resource administration item 840 exemplarily shown in FIG. 10 may include a common unit item 841, a function application item 842, and a change history item 843, and the resource administration item 840 exemplarily shown in FIG. 12 may include a common unit item 841, a function application item 842, a change history item 843, and a map administration item 844 capable of administrating map data.

Figure 13:
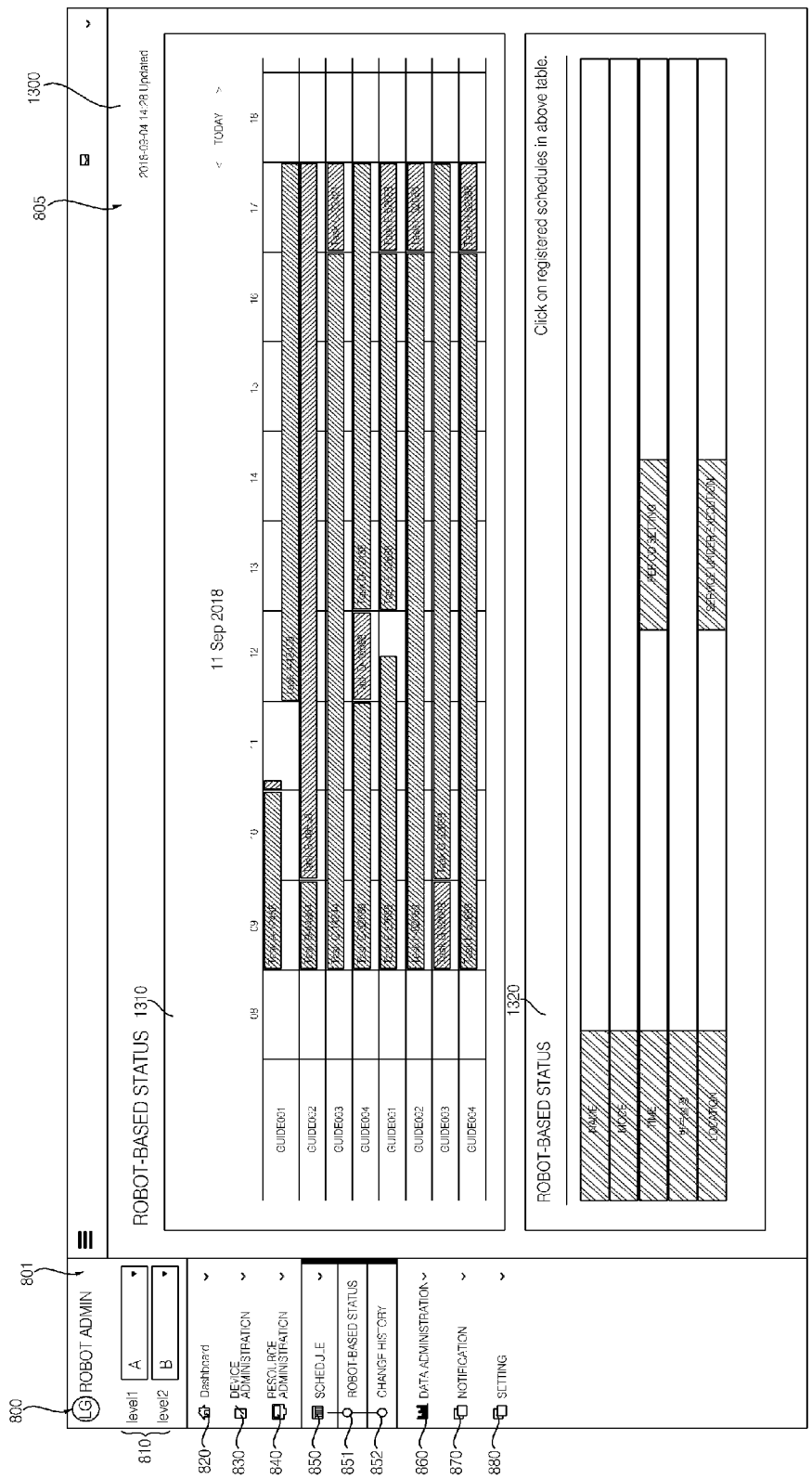
Figure 14:
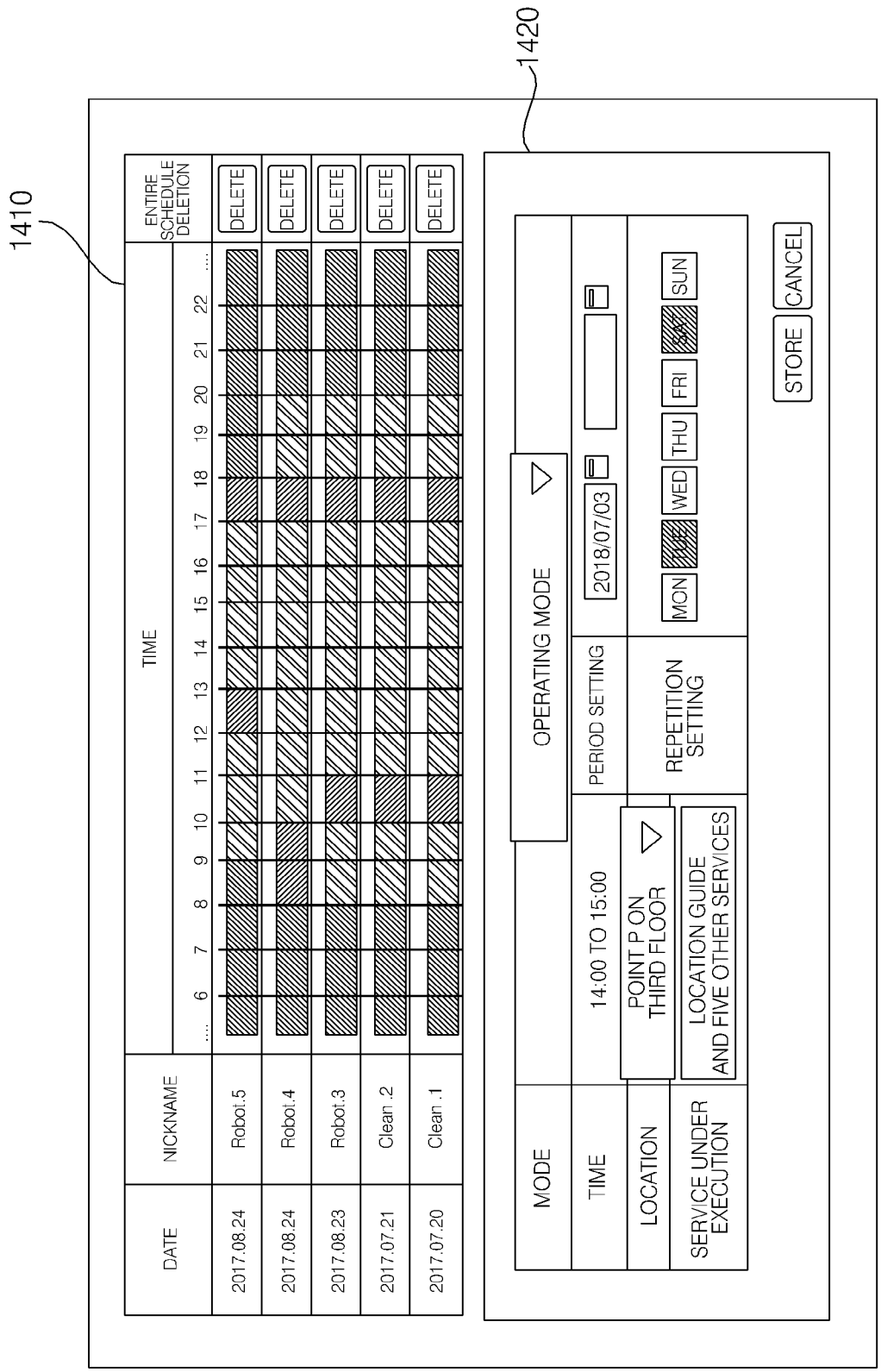

FIG. 13 exemplarily shows the case in which the schedule item 850 is selected and a schedule administration screen 1300 is displayed in the information area 805, and FIG. 14 exemplarily shows the schedule administration screen that is being edited.

Referring to FIG. 13, the schedule administration screen 1300 may include a schedule status item 1310, in which robot-based schedules are disposed on a calendar and/or a timeline, and a details item 1320, in which the details of one selected from among the schedules.

In the schedule status item 1310, a time at which a task is assigned in the timeline assigned to each robot may be expressed as a graph, and, in the schedule status item 1310, tasks assigned to each robot may be displayed in different colors depending on the kind of the tasks. Consequently, the administrator may intuitively check the schedule of the robot.

In addition, the administrator may perform robot-based and time-zone-based task administration using the schedule administration screen 1300.

Referring to FIG. 14, the administrator may select a section of 14:00 to 15:00 on the timeline of a specific robot in a schedule status item 1310. As a result, a details setting screen 1420 may be displayed in at least a portion of a display screen of the client 40, and it is possible to input an operation mode at the time zone and setting of repetition.

According to an embodiment of the present invention, the server 10 may provide entire statistical data based on data gathered from all robots, kind-based statistical data based on data gathered from the same kind of robots, and individual statistical data based on data received from individual robots.

In addition, the server 10 may provide function- or service-based statistical data based on data gathered from robots capable of performing predetermined functions or services.

Figure 15:
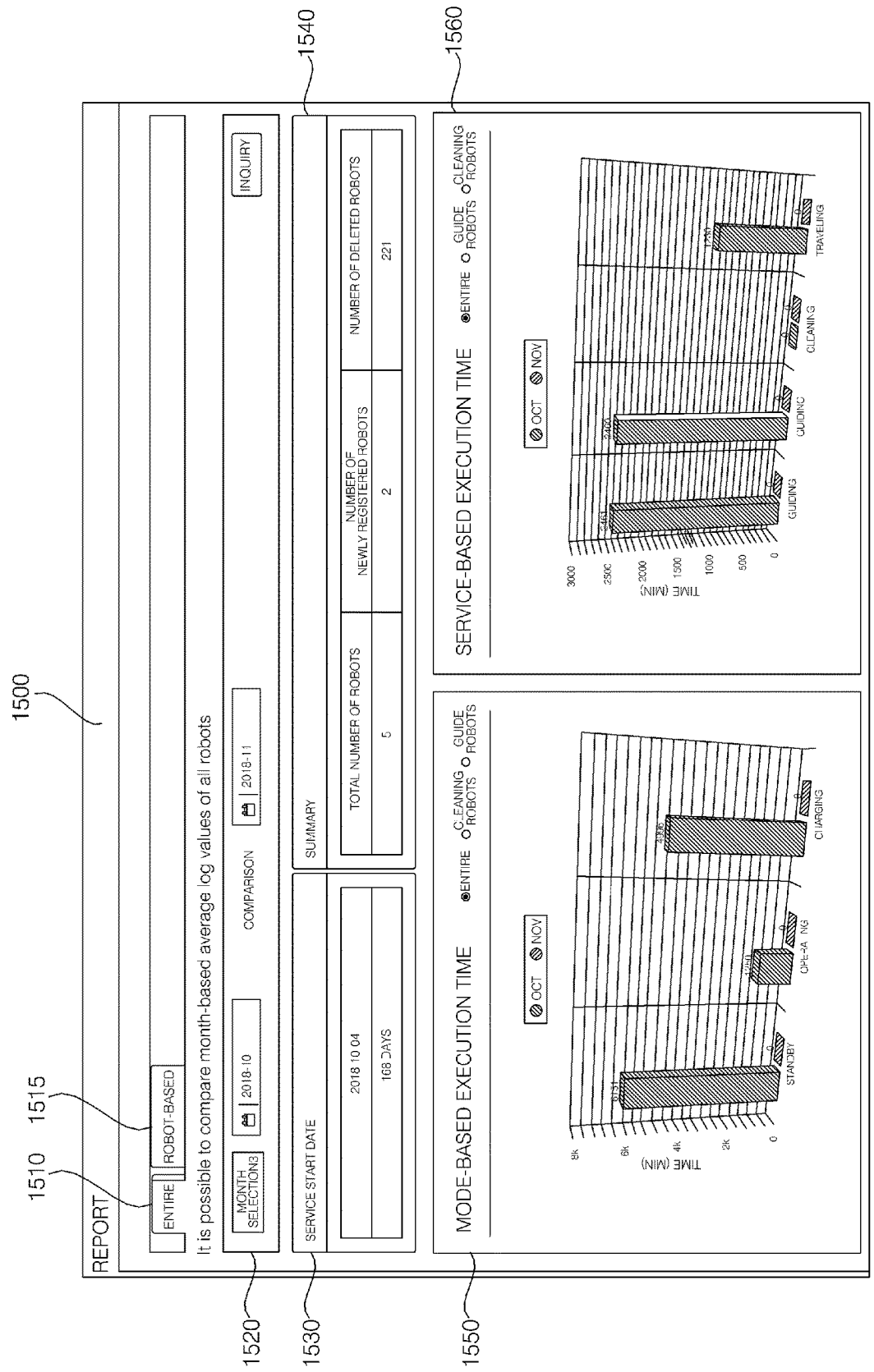

FIG. 15 exemplarily shows a data administration screen 1500 in which the data administration item 860 is selected and displayed.

The user may select tab menus 1510 and 1515 of the data administration screen 1500 in order to check various kinds of data.

For example, the user may select the entire tab menu item 1510 in order to check the year-, month-, week-, day-, and time-zone-based average log values of all robots and statistical data.

In addition, the user may select the robot-based tab menu item 1510 in order to check the average log value of the specific kinds of robots or the log value of an individual robot and statistical data.

Referring to FIG. 15, in the case in which the entire tab menu item 1510 is selected, service start date information 1530, robot registration deletion summary information 1540, mode-based execution time information 1550, and service-based execution time information 1560, which are statistically processed based on all robots, may be displayed in the user interface screen.

In some embodiments, the data administration screen 1500 may further include an inquiry period selection item 1520, and the inquiry period selection item 1520 may be manipulated in order to set a period during which statistical data will be provided.

The server 10 may provide a highly readable user interface for easy understanding of ordinary people. For example, as shown in FIG. 15, the mode-based execution time information 1550 and the service-based execution time information 1560 may be provided as highly readable graphs.

In addition, according to an embodiment of the present invention, it is possible to provide a data analysis report capable of creating added value through the analysis of data collectable by the robots, such as customer profiles, occupation and separation points, and customer concentration areas, in addition to the provision of a simple log level statistics function.

For example, the server 10 may compare a specific mode/service execution time for all robots or each robot in order to check the difference between before and after.

The server 10 may provide a report such that the execution time for each mode (operation, charging, standby) or each service (location guide, photographing, etc.), total traveling distance, and number of times that errors occur are inquired and compared for all robots or each robot.

In addition, the profile information of the customers that have used the robots or occupation and separation point data may be analyzed in order to provide a premium report. For example, the server 10 may derive implication, such as preference, through profile analysis based on face recognition of the customers that have accessed the robots and analysis of initial access and separation times of the customers.

In addition, it is possible to analyze congestion in a specific zone, to measure product advertising and guest reception effects through analysis of congestion at a specific point, to analyze a main customer base through customer profile analysis using robots, and to measure advertising effects through analysis of initial access times, separation times, and times taken until separation is performed (which may be linked to another solution).

The server according to the present invention, the robot system including the same, and the method of controlling the server and the robot system are not limitedly applied to the constructions and methods of the embodiments as previously described; rather, all or some of the embodiments may be selectively combined to achieve various modifications.

Meanwhile, the method of controlling the server according to the embodiment of the present invention and the robot system including the same may be implemented as code that can be written on a processor-readable recording medium and thus read by a processor. The processor-readable recording medium may be any type of recording device in which data is stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

The invention claimed is:

1. A robot system comprising:
a plurality of robots; and
at least one server based on cloud services that communicates with the plurality of robots, and monitors and controls the plurality of robots,
wherein
the at least one server receives data from an external device and updates the plurality of robots based on the received data,
the plurality of robots include different kinds of robots that perform different functions or services,
the at least one server further provides, to a client, an interface that presents information about respective statuses of the different kinds of robots, and
the least one server, when updating the plurality of robots based on the received data, is further to:
identify a first portion of the received data that relates to a function of all of the plurality of robots;
identify a second portion of the received data that relates to a function of a specific robot;
upload the first portion to all of the plurality of robots; and
upload the second portion only to the specific robot.

2. The robot system according to claim 1, wherein the server periodically receives the data from the external device and updates the plurality of robots based on the periodically received data.

3. The robot system according to claim 1, wherein the second portion includes a plurality of second portions corresponding to the different kinds of robots, and wherein the at least one server is further to upload the each of plurality of second portions only to a corresponding one of the different kinds of robots.

4. The robot system according to claim 1, wherein the least one server includes:
a control server that communicates with the client to provide the user interface and communicates with the plurality of robots to administer and control the plurality of robots.

5. The robot system according to claim 4, wherein the least one server further includes:
- a device administration server that relays and administers data related to the plurality of robots; and
- a map server that provides map data related to respective locations of the plurality of robots.

6. The robot system according to claim 4, wherein the control server includes:
- a control service server that monitors a state and a location of each of the plurality of robots, administers content distribution to the plurality of robots, and administers task schedules to the plurality of robots, and
- an administrator application server that administers an application related to managing the plurality of robots.

7. The robot system according to claim 1, wherein the user interface includes a first section that provides status information regarding the plurality of robots and second sections that provide state information related to corresponding ones of the different kinds of robots.

8. The robot system according to claim 7, wherein one of the second sections presents:
- a robot kind title item identifying a corresponding one of the different kinds of robots,
- a current state title items identifying different states for ones of the robots included in the corresponding kind of robots identified in the robot kind title item, and
- robot number information identifying respective quantities of ones of the robots corresponding to the current state title items, and
- wherein the current state title items and the robot number information are displayed in different colors depending on the correspond ones of the different states.

9. The robot system according to claim 7, wherein the user interface further includes a third section that presents location status information in which current locations of one or more of the plurality of robots are displayed on a map, and individual robot state information is identified for each of the one or more of the plurality of robots represented in the map.

10. The robot system according to claim 1, wherein the least one server provides entire statistical data based on data gathered from all robots, kind-based statistical data based on data gathered from corresponding ones of the different kinds of robots, and individual statistical data based on data received from individual robots.

11. The robot system according to claim 1, wherein the least one server provides function-based or service-based statistical data based on data gathered from ones of the plurality of robots capable of performing predetermined functions or services.

12. A cloud server comprising:
- a control server that:
  - communicates with a plurality of robots,
  - monitors and controls the plurality of robots, wherein the plurality of robots include different kinds of robots that perform different functions, and
  - provides a user interface that provides information about the different kinds of robots to a client; and
- a device administration server that relays and administers data related to the plurality of robots with the control server,
- wherein the control server receives data from an external device and updates the plurality of robots based on the received data, and
- wherein the control server, when updating the plurality of robots based on the received data, is further to:
  - identify a first portion of the received data that relates to a function of all of the plurality of robots;
  - identify a second portion of the received data that relates to a function of a specific robot;
  - upload the first portion to all of the plurality of robots; and
  - upload the second portion only to the specific robot.

13. The cloud server according to claim 12, wherein the second portion of the received data includes a plurality of second portions corresponding to two or more different kinds of the plurality of robots, and wherein the control server is further to upload the each of plurality of second portions only to the corresponding one of the different kinds of robots.

14. The cloud server according to claim 12, further comprising:
- a map server for providing map data related to locations of the plurality of robots, wherein the user interface further provides information regarding locations for a selected kind of robot.

15. The cloud server according to claim 12, wherein the control server includes:
- a control service server that communicates with the client to provide the user interface and communicates with the plurality of robots to administer and control the plurality of robots, and an administrator application server that administers an application related to managing the plurality of robots.

16. The cloud server according to claim 12, wherein the user interface includes a first section that provides status information regarding the plurality of robots and a second section that provides state information related to one or more of the different kinds of robots.

* * * * *